United States Patent [19]
Fierro et al.

[11] Patent Number: 5,948,969
[45] Date of Patent: Sep. 7, 1999

[54] METHODS FOR MEASURING THE FLOW RATE DUE TO A LEAK IN A PRESSURIZED PIPE SYSTEM

[75] Inventors: Michael R. Fierro; Joseph W. Maresca, Jr.; James W. Starr, all of Mountain View, Calif.

[73] Assignee: Vista Research, Inc., Mountain View, Calif.

[21] Appl. No.: 08/954,002

[22] Filed: Oct. 20, 1997

[51] Int. Cl.⁶ .............................. G01M 3/04; G01M 3/08
[52] U.S. Cl. ........................................ 73/40.5 R; 73/49.1
[58] Field of Search ......................... 73/40.5 R, 49.2, 73/49.1, 40; 364/509, 564, 558

[56] References Cited

U.S. PATENT DOCUMENTS

| | | | |
|---|---|---|---|
| 3,537,298 | 11/1970 | Kapf | 73/49.2 |
| 3,538,746 | 11/1970 | Jacobs et al. | 73/49.2 |
| 3,690,150 | 9/1972 | Mullen | 73/40.5 R |
| 3,702,074 | 11/1972 | Mullen | 73/40.5 R |
| 3,910,102 | 10/1975 | McLean | 73/40.5 R |
| 4,090,394 | 5/1978 | Herman et al. | 73/37 |
| 4,103,537 | 8/1978 | Victor | 73/40.5 R |
| 4,114,426 | 9/1978 | McLean | 73/40.5 R |
| 4,590,793 | 5/1986 | Staats, Jr. | 73/40 |
| 4,608,857 | 9/1986 | Mertens et al. | 73/40.5 R |
| 4,646,560 | 3/1987 | Maresca, Jr. et al. | 73/49.2 |
| 4,852,054 | 7/1989 | Mastandrea | 364/509 |
| 4,918,968 | 4/1990 | Hoffman | 73/40 |
| 4,986,113 | 1/1991 | Harrison et al. | 73/49.2 |
| 5,078,006 | 1/1992 | Maresca, Jr. et al. | 73/40.5 R |
| 5,090,234 | 2/1992 | Maresca, Jr. et al. | 73/49.1 |
| 5,127,266 | 7/1992 | Maresca et al. | 73/290 V |
| 5,163,314 | 11/1992 | Maresca, Jr. et al. | 73/40.5 R |
| 5,170,657 | 12/1992 | Maresca, Jr. et al. | 73/40.5 R |
| 5,189,904 | 3/1993 | Maresca, Jr. et al. | 73/40.5 R |
| 5,201,212 | 4/1993 | Williams | 73/40.5 R |
| 5,263,371 | 11/1993 | Maresca, Jr. et al. | 73/290 V |
| 5,375,455 | 12/1994 | Maresca, Jr. et al. | 73/40.5 R |
| 5,388,445 | 2/1995 | Walters et al. | 73/40.5 R |
| 5,415,033 | 5/1995 | Maresca, Jr. et al. | 73/40.5 |
| 5,453,944 | 9/1995 | Baumoel | 364/578 |
| 5,526,679 | 6/1996 | Filippi et al. | 73/40.5 R |

FOREIGN PATENT DOCUMENTS

| | | | |
|---|---|---|---|
| 2345170 | 3/1984 | Germany | 3/51 |
| 3928679 | 3/1991 | Germany . | |
| 55-154433 | 2/1980 | Japan | 3/26 |
| 55-98327 | 7/1980 | Japan | 3/26 |

*Primary Examiner*—Hezron Williams
*Assistant Examiner*—Jay L. Politzer
*Attorney, Agent, or Firm*—David H. Jaffer

[57] ABSTRACT

A method and improved apparatus for detecting leaks in pressurized pipeline systems, which compensate for the thermally induced volume changes of the liquid in the line during a test that are produced by both the nonlinear changes in the mean temperature of the liquid and the pressure-induced perturbations of the temperature of the liquid.

57 Claims, 9 Drawing Sheets

METHODS FOR MEASURING THE FLOW RATE DUE TO A LEAK IN A PRESSURIZED PIPE SYSTEM

1. BACKGROUND OF THE INVENTION

1.1 Field of the Invention

The present invention relates to a method for accurate and reliable detection and quantification of leaks in pressurized pipe systems containing a liquid such as water, petroleum fuels and products, and other hazardous and nonhazardous substances. High performance is achieved because the method accurately compensates for the product temperature changes that occur during a test. The flow rate due to a leak, after the product temperature changes have been compensated for, is computed as part of the test. An apparatus for implementing the method on a pipe system is also described.

1.2 Brief Discussion of Prior Art

In U.S. Pat. Nos. 5,078,006; 5,090,234; 5,163,314; 5,170,657; 5,189,904; and 5,375,455, Maresca et al. describe a volumetric method for detection of leaks in a pressurized pipe system containing a liquid, and four general types of apparatuses to implement this method. The method and improvements to the method, which are described in U.S. Pat. Nos. 5,078,006 and 5,375,455, respectively, require that the pipe segment to be tested (1) be completely isolated from the remainder of the system by valves or valve blinds and (2) be pressurized to at least two different levels sequentially. These methods compensate for the thermal expansion and contraction of the liquid product in a pressurized pipe system and measure the difference in the volumetric flow rate due to a leak, if one is present, between two pressures. The main purpose of the apparatuses is to adjust and regulate line pressure and to measure the change in volume of the liquid product in the pipe system at a constant pressure.

1.2.1 Ambient Product Temperatures Changes

These methods and the apparatuses used to implement them are generally intended to test pipe systems that are located underground, but they can also be used on systems that are above ground or that are only partially buried. They can be used on lines containing any type of liquid. When applied to pipe systems containing petroleum fuels they have important advantages over other methods, because they can deal with large, nonlinear thermally induced volume changes. Petroleum lines experience large thermally induced volume changes because the coefficient of thermal expansion for petroleum fuels is large and the product temperature changes can also be large.

FIG. 1($a$) is a time series showing the typical thermal behavior of product brought into a line at a warmer temperature than the backfill and soil surrounding the line; FIG. 1($b$) shows the time series of the rate of change of temperature. The thermally induced volume changes are proportional to temperature, and they scale according to the volume of liquid in the line and the coefficient of thermal of expansion of that liquid. Thus, the two time series in FIG. 1 also illustrate the thermally induced volume changes that occur in the line. In this disclosure, we refer to this type of product temperature and product volume change as an ambient thermal change to distinguish it from other types of product temperature and product volume changes.

The observed curvature in both the temperature (or volume) and rate of change of temperature (or rate of change of volume) in FIG. 1 clearly illustrates the nonlinear changes in product temperature that occur during a test. When high performance is desired, testing with conventional volumetric methods, which do not compensate for the product temperature changes, cannot be initiated until the rate of change of temperature is such that volume changes are negligible. This means that the line must be taken out of service for whatever length of time is necessary to reach this stage of negligible thermal changes. Small lines at retail service stations may require a waiting period of 2 to 12 h, lines at bulk fuel storage facilities 12 to 36 h, and airport hydrant lines 1 to 3 days. This approach has adverse operational and performance implications. First, transfer operations may need to cease for an unacceptably long period of time. Second, there is no way to guarantee that a presumably adequate waiting period is in fact sufficiently long for thermal changes to dissipate. Third, even if the waiting period is adequate there is no way to verify quantitatively that the rate of thermal change is negligible or to verify that product temperature has not changed in response to other heat sources and sinks (e.g., heating or cooling of a section of an underground pipe that is exposed to sun or clouds).

The method and improvements to the method described in U.S. Pat. Nos. 5,078,006 and 5,375,455 are designed to compensate for the thermally induced volume changes produced by the ambient nonlinear changes in product temperature and thus to eliminate the need for the long pre-test waiting periods required by conventional testing methods. FIGS. 2 through 4 illustrate some of the pressure and measurement-period configurations commonly used for the conduct of a leak detection test; all of the configurations shown are based on three measurement periods. The configurations shown in FIG. 2 are described in U.S. Pat. No. 5,078,006, and the configurations shown in FIGS. 3 and 4 are described by U.S. Pat. No. 5,375,455. Each measurement period is numbered from 1 to 3 in the order of the data collection.

In the preferred application of the method, a test is conducted at two different levels of pressure, and the changes in the volume of product that occur at each of these two levels are measured at each of three equally spaced measurement periods (also referred to as measurement segments in this disclosure). In the first patent, two changes of pressure are required during a test, with the pressure during the first and third measurement periods being approximately the same. As described in the second patent, a test can be conducted with only one pressure change, with the pressure being maintained approximately constant during either the first and second measurement periods or the second and third measurement periods. This simplification, wherein the pressure can be the same in two consecutive measurement periods, has both operational and performance benefits. This improved method can be used (1) to minimize the volumetric transients that occur each time the pressure in the line is changed, (2) when storage, handling or disposal of product is difficult, or (3) for simplification of the test protocol. If one of the pressures described in either patent is atmospheric (zero gauge pressure), then a direct estimate of the flow rate due to a leak can be made at the other pressure. For some applications, more complicated test configurations are used, involving three or more pressures and/or four or more measurement periods.

If a leak is present, the volume data collected during each of the measurement periods are used to compute the difference in the temperature-compensated volume rate (TCVR) between the average flow rate due to the leak present in the first and third measurement periods, and the flow rate due to the leak present in the second measurement period. TCVR is computed by differencing (a) and (b), where (a) is the average of the volume rates measured during the first and third periods and (b) is the volume rate measured during the second period; the TCVR is also referred to as the test result. The volume rate (i.e., rate of change of volume, which is the first derivative of the volume data) measured during any given period is computed by dividing the volume change during a measurement period by the duration of the measurement period.

Stated in a general way, the method computes the TCVR from the difference between an estimate of the rate of change of volume during the second period (but at a different pressure), and the actual, measured volume rate during that same period. In the absence of a leak, the average rate of change of volume estimated from the first and third periods is a good estimate of the measured rate of change of volume during the second period, provided that the change in product temperature is not highly nonlinear. If a leak is present, then this difference yields a good estimate of the flow rate due to the leak in accordance with the pressure difference. This differencing method works well because it accounts for the nonlinear product temperature changes that occur during a test. The method is extremely effective if the second derivative of the volume data is approximately constant. The method is designed to compensate for the ambient thermally induced product temperature changes perfectly when the second derivative of the volume data is a constant. Degradation in performance occurs if the product temperature field is highly nonlinear (i.e., if the second derivative of the product temperature changes is not constant). Such problems occur if the product temperature field is very strong or if the total duration of the test is very long. Thus, the best accuracy is achieved when the total duration of a test is as short as possible (to minimize the magnitude of the nonlinear changes), and the duration of each measurement period is sufficiently long to make an accurate estimate of the rate of change of volume during each measurement period.

This differencing method is effective in detecting a leak because the rate of change of volume due to a leak varies as a function of pressure, whereas that due to the ambient thermal effects does not. The purely leak-induced volume change, which is expressed as a volume rate, will be constant at each given pressure but will differ from one pressure to the other. For a given hole in the line, leak-induced volume changes will be greater at a higher pressure than a lower one. The ambient product temperature field, except for small thermal perturbations that occur whenever the pressure in the line is changed, is unaffected by the pressure in the line. The differencing approach works because it compensates directly for thermally induced volume changes and does not affect the volume changes due to a leak.

For accurate test results, several constraints were placed on the test configurations illustrated in FIGS. 2 through 4. First, the duration of each measurement period had to be the same. Second, the intervals between periods, which generally differ in length from the duration of the periods themselves, also had to be equal. Finally, for the test configurations shown in FIGS. 2 and 3, the interval between the initiation of each pressure change and the beginning of the next measurement period had to be the same.

An estimate of the error in temperature compensation (referred to as the test error) can be computed directly if additional measurement periods are included at the beginning or the end of the test. In order to compute the test error, volume data must be collected at the same pressure in three consecutive measurement periods. The same differencing computation used for conducting a leak detection test is used to compute the test error. When the pressure is the same in all three measurement periods, the measured flow rate due to the leak will be zero. Any residual volume change that is measured will simply be the error in temperature compensation due to the presence of higher-order nonlinearities in the product temperature field.

1.2.2 Pressure-Induced Product Temperatures Changes

Additional operational and performance benefits could be realized by implementing the method with only two measurement periods. In U.S. Pat. Nos. 5,078,006 and 5,375,455, it was noted that the time interval between periods may need to be longer than the minimum time required to change pressure; this is to allow any transients and instabilities produced by the pressure change to subside so that accurate volume measurements can be made. The most important instability, the "small" temperature change associated with any pressure change, produces a perturbation in the underlying ambient product temperature field that degrades the performance of these methods. FIG. 5 illustrates (in an exaggerated way) the pressure-induced thermal perturbation resulting from increasing and decreasing pressure changes. The underlying ambient product temperature as it would have been had there been no pressure change is shown by the dashed line. These pressure-induced product temperature changes, which may be several hundredths to several tenths of a degree Centigrade, occur because the pressure change compresses the liquid or causes it to expand. An increase/decrease in pressure produces a small increase/decrease in temperature and vice versa. The degradation in performance occurs because the method assumes that the ambient product temperature changes occur monotonically during the entire test, and this assumption is violated by the small increase or decrease in temperature associated with the pressure changes during a test. In general, this is not a problem for tests conducted on small lines or over small pressure differences; however, it can be important when tests are conducted on large lines and over large pressure differences—for example, the petroleum fuel lines found at some bulk storage facilities and in most airport hydrant fuel distribution systems.

These thermal perturbations in temperature may take tens of minutes to many hours to come into equilibrium with the underlying ambient product temperature field. The magnitude of the temperature perturbation at a given point in time is dependent on the magnitude of the pressure change, the time that elapses between the pressure change and the next measurement period, the volume of product in the pipe system, and the system characteristics that control the rate of change of temperature of the product in the pipe (e.g., pipe diameter and pipe wall material, type of product in the pipe, and the type, characteristics, and condition of the backfill and soil surrounding the pipe). In many instances, after tens of minutes, the rate of change of temperature caused by these anomalous phenomena is too small to measure with most common temperature measurement sensing systems. However, if the line contains a large amount of product, the thermally induced volume changes may still be great in comparison to the size of the leak to be detected.

Pressure-induced thermal perturbations produce a systematic error, or bias, in the temperature-compensated volume rate computed from the volume data. For a given liquid product, the magnitude of this systematic error depends on the volume of product in the line, the difference between the low and high pressures used to conduct a test, and the time that elapses between any pressure changes and the subsequent measurement periods. If the liquid product in the line changes, then the magnitude of the systematic error also depends on the magnitude of the coefficient of thermal expansion of the liquid and the bulk modulus of the liquid. Whether or not this system error can be tolerated during a test depends on the performance desired of the system (i.e., the smallest leak to be detected). The systematic error can be reduced by reducing the volume of product in the line being tested, by reducing the magnitude of the pressure difference used in testing the line, by reducing the number of pressure changes required to conduct a test, or by increasing the time between any pressure change and the subsequent measurement period. This error can also be compensated for by calibration. All of these approaches, however, are dependent on each other, and each one of these approaches also has a number of drawbacks that can impact the performance of the method or its application to the particular line to be tested.

Reducing the volume of product in the line is effective, because the flow rate due to a leak does not scale with product volume and the volume changes due to the perturbation do. Dividing the line into smaller segments in order to reduce the effective volume of product, however, may not be possible, practical, or desirable. The maximum-size line that can be tested will depend on the performance requirements, the pressure difference, and the time between the pressure changes and the measurement periods.

Reducing the magnitude of the pressure change is not as effective as reducing the volume of product, because the perturbation and the volume changes due to a leak both scale with pressure. Such an approach is not always possible if the line must be tested at a prescribed pressure or if the pressure difference is not sufficient to detect the leak rate of interest.

Reducing the number of pressure changes is an effective way minimize the adverse effect of the thermal perturbation on the accuracy of a test. This can be accomplished, for example, by initiating a test at the existing pressure of the line.

Increasing the interval between any pressure change and the subsequent measurement period can be an effective means of addressing the adverse effects of the perturbation, since these decrease with time. However, if the duration of the test becomes too long, the accuracy with which the methods described above compensate for the ambient thermally induced volume changes is degraded. This is because the rate of change of temperature does not decrease linearly over long periods of time. Thus, for optimal performance, a balance must be found between the length of the intervals (between the measurement periods and the pressure changes) and the total length of the test.

The magnitude of the thermal perturbation can also be reduced by calibration. In a short test, the magnitude of this effect may be 2 to 10 times larger than the magnitude of the leak to be detected. In order to compensate for an effect of this magnitude, the calibration must be conducted with great accuracy. The calibration data must be collected on the line to be tested at the time when that line is known to be leak-free, i.e., when it has already been tested by another method. A calibration approach was described by Mertens in U.S. Pat. No. 4,608,857 for a pressure test, where the effects of these perturbations are described as "creep."

The performance and operational implementation of the methods described in U.S. Pat. Nos. 5,078,006 and 5,375,455 could be improved if: (1) the interval between any pressure change and any subsequent measurement period were increased, thereby reducing the effect of the thermal perturbation associated with that pressure change, and (2) the nonlinear changes in ambient product temperature, which become significant when the said interval is increased, were compensated for in such a way that the accuracy of the overall thermal compensation scheme was not affected by the duration of the test. If the latter improvement can be accomplished, the calibration requirement can be eliminated or at least reduced to the point where an analytical model or generalized database would predict the effects of perturbation with sufficient accuracy to allow the detection of small leaks.

1.2.3 Apparatuses for Testing Bulk Transfer Lines and Airport/Marine Hydrant Distribution Fuel Lines U.S. Pat. No. 5,415,033 describes a simplified apparatus for implementing the method and for improving the accuracy of the volumetric measurements made during a leak detection test, but without the need for high-precision sensors and complex electromechanical systems. This simplified apparatus, which uses a passive means of maintaining constant pressure, can be used for testing applications in which very strict pressure control is not required. It can, for example, accurately test underground transfer lines at bulk storage facilities that may contain thousands of gallons of petroleum product. (It can also be used to test the small lines found at retail service stations.) For larger lines, like those that comprise airport hydrant fuel distribution systems, better pressure control and automation are required. The apparatus described in U.S. Pat. No. 5,090,234, which uses an active means of maintaining constant pressure during the volume measurements, can be used for testing these larger lines. This apparatus uses a pressure-feedback measurement system and a two-way pump (or two single pumps) for pressure management. A simpler, less expensive, and more accurate pump-apparatus for implementing these methods (which has application to these and other types of pipe systems) would be beneficial.

2. SUMMARY OF THE INVENTION

It is the object of this invention to provide a method for reliable and accurate detection of leaks in pressurized pipe systems containing liquids, including water, petroleum products, and hazardous and nonhazardous substances.

Another object of this invention is to provide a method of quantitatively estimating the difference in the rate of volume change (flow rate) due to a leak in a pipe system at two pressures.

Yet another object of this invention is to provide a method of compensating for the thermal expansion and contraction of the product in the pipe and of the pipe itself.

Yet another object of this invention is to provide a method of estimating the error in compensating for the thermal expansion and contraction of the product in the pipe and of the pipe itself.

Another object of this invention to provide a method for detection of leaks in a pressurized pipe system containing liquids that is designed to work well when the rate of change of product temperature is nonlinear.

Yet another object of this invention to provide a method for the detection of leaks in pressurized pipelines containing liquids that is designed to minimize the effects of pressure-induced thermal perturbations to the ambient product temperature field.

A further object of this invention is to provide a method for testing a pressurized pipe system for leaks by collecting and analyzing data at a minimum of two pressures and with as few as two measurement periods.

Another object of this invention is to provide a method that can be used to test pipe systems for leaks without the use of any a priori calibration or empirical data on, analytical or empirical models for, or general knowledge about the status of the pipe system to be tested or other similar pipe systems when in a nonleaking condition.

Another object of this invention is to provide an apparatus to conduct a leak detection test with a very accurate pressure control system.

The present invention is designed to detect small leaks in pipe systems that contain any type of liquid product and that are either pressurized or can be placed under pressure for the duration of a test. The invention requires that the line undergo a leak detection test while its liquid contents are at rest, i.e. no flow in the line. The invention is particularly useful in underground or underwater pipe systems, but can also be used on pipe systems located above ground, such as those found in buildings or placed in specialized containment systems. Because the device will compensate for thermally induced changes in the volume of the product during a test, it is particularly useful for liquids that have a high coefficient of thermal expansion compared to water. The major application of this invention is for the detection and quantification of the flow rate produced by a leak in underground pressurized pipe systems containing petroleum products.

The present invention improves upon the performance of the previous methods described in U.S. Pat. Nos. 5,078,006 and 5,375,455 by more accurately compensating for the product temperature conditions in the line. The present invention works under a wide range of ambient and operational product temperature conditions, including conditions when the ambient product temperature changes are highly nonlinear and the ambient product temperature field contains pressure-induced thermal perturbations and/or other thermal anomalies. The use of higher-order derivatives allows accurate results to be obtained even when the product temperature field is highly nonlinear, i.e., when the rate of change of product temperature is nonlinear.

The preferred embodiment of the present invention permits the volume data to be collected during only two measurement periods, one at each of two different pressures. The first and second derivatives of the volume data are computed and then used to compensate for the thermally induced product volume changes during the test. If a leak is present, the test result is a measure of the difference in the volume rate due to a leak at the two pressures. When one of the pressures is atmospheric, the result is an estimate of the leak rate at the other pressure.

The use of higher-order derivatives further allows for greater separation between the perturbations introduced by the pressure change and the measurement periods without degrading the performance of the temperature compensation scheme. Maximizing the separation time between measurement periods and the pressure-change-induced thermal perturbations is an important way to reduce the effect of these perturbations on the test result. By reducing the magnitude of the effect in this way, the requirement for calibration can be eliminated or relaxed such that a priori data collected on the pipe system being tested is not required.

An apparatus is described that can be used to conduct a leak detection test using the methods of this disclosure and of prior-art patents (U.S. Pat. Nos. 5,078,006 and 5,375,455). This apparatus is comprised of a measurement and storage system for adding or removing known volumes of liquid to or from the pipe system to be tested, a simple system for changing the pressure in the line, a very accurate means for maintaining that pressure at a constant level, a system controller, and a data acquisition and processor system. By way of simplification, the two-way pump apparatus described in U.S. Pat. No. 5,090,234, which maintains constant pressure during the test, is replaced by a one-way pump and one or more pressure-relief valves. Whenever line pressure drops below the set value, the one-way pump adds product to the pipe system, and whenever line pressure rises above this set value, the pressure relief valve allows product to leave the pipe system. With this apparatus, very accurate pressure control is obtained by operating the pump continuously during a test so that flow is allowed across the pressure relief valve. The improved apparatus provides a simpler, less expensive, and more accurate means of conducting a leak detection test.

3. BRIEF DESCRIPTION OF THE DRAWINGS

FIG. 1 is an example of how the temperature of the product changes in an underground pipe system after product transfers cease, in which the temperature of the product in the pipe system is greater than that of the surrounding backfill and soil. FIG. 1(a) is a time history of product temperature, and FIG. 1(b) illustrates the rate of change of product temperature.

FIG. 2 illustrates several three-segment data collection schemes for conducting a leak detection test that are described in U.S. Pat. No. 5,078,006.

FIG. 3 illustrates several three-segment data collection schemes for conducting a leak detection test that are described in U.S. Pat. No. 5,375,455.

FIG. 4 illustrates several two-segment data collection schemes for conducting a leak detection test that are described in U.S. Pat. No. 5,375,455.

FIG. 5 is an example of thermal changes in the product in a pipe system given the same variables described in FIG. 1 (where product is added whose temperature differs from that of the surrounding backfill and soil) but with the additional variable that pressure is increased and decreased as it is during a leak detection test. The test protocol is illustrated in FIG. 5(a) and the time history of the product is illustrated in FIG. 5(b).

4. DESCRIPTION OF THE PREFERRED EMBODIMENT

Figure 1:
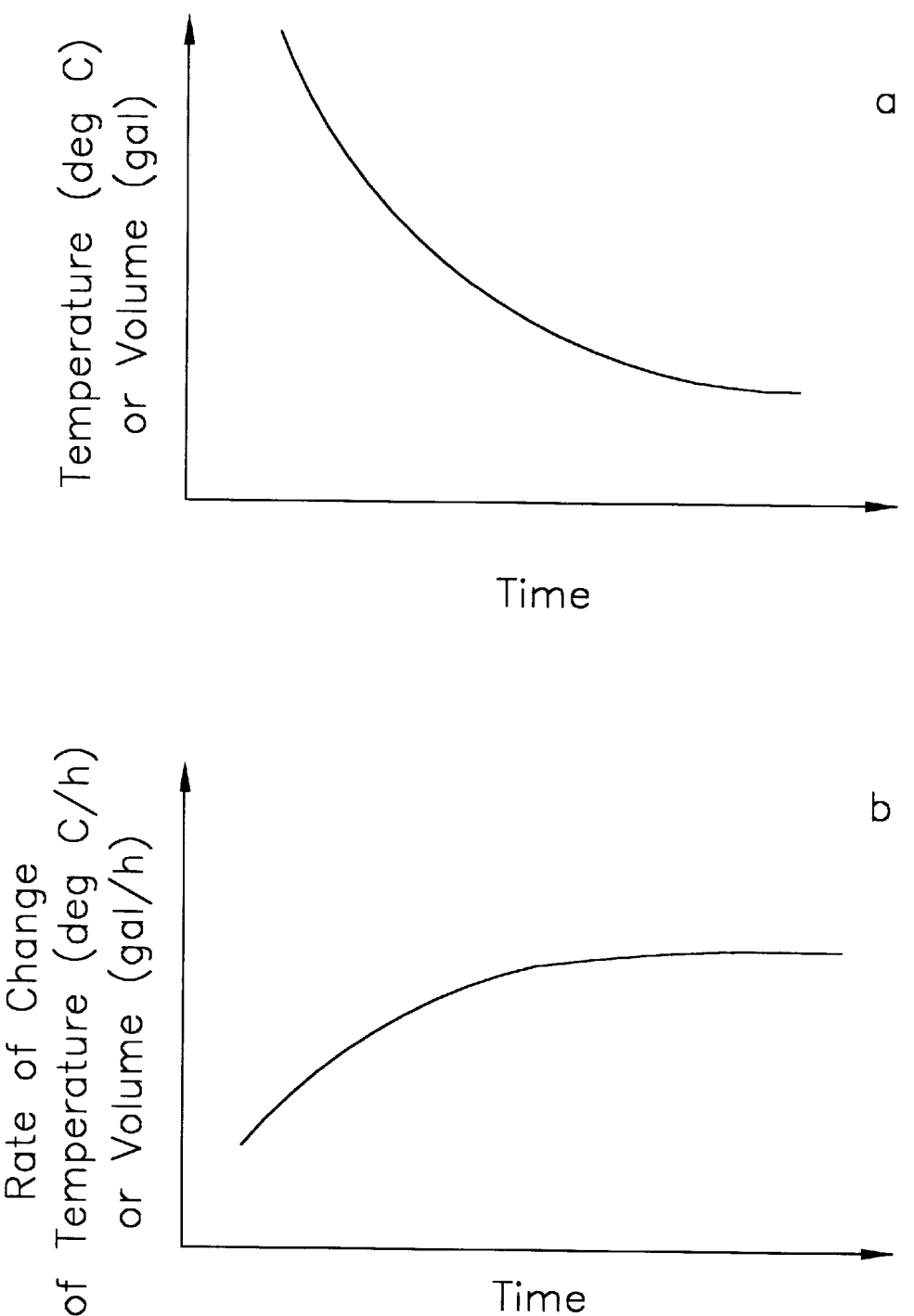
Figure 2:
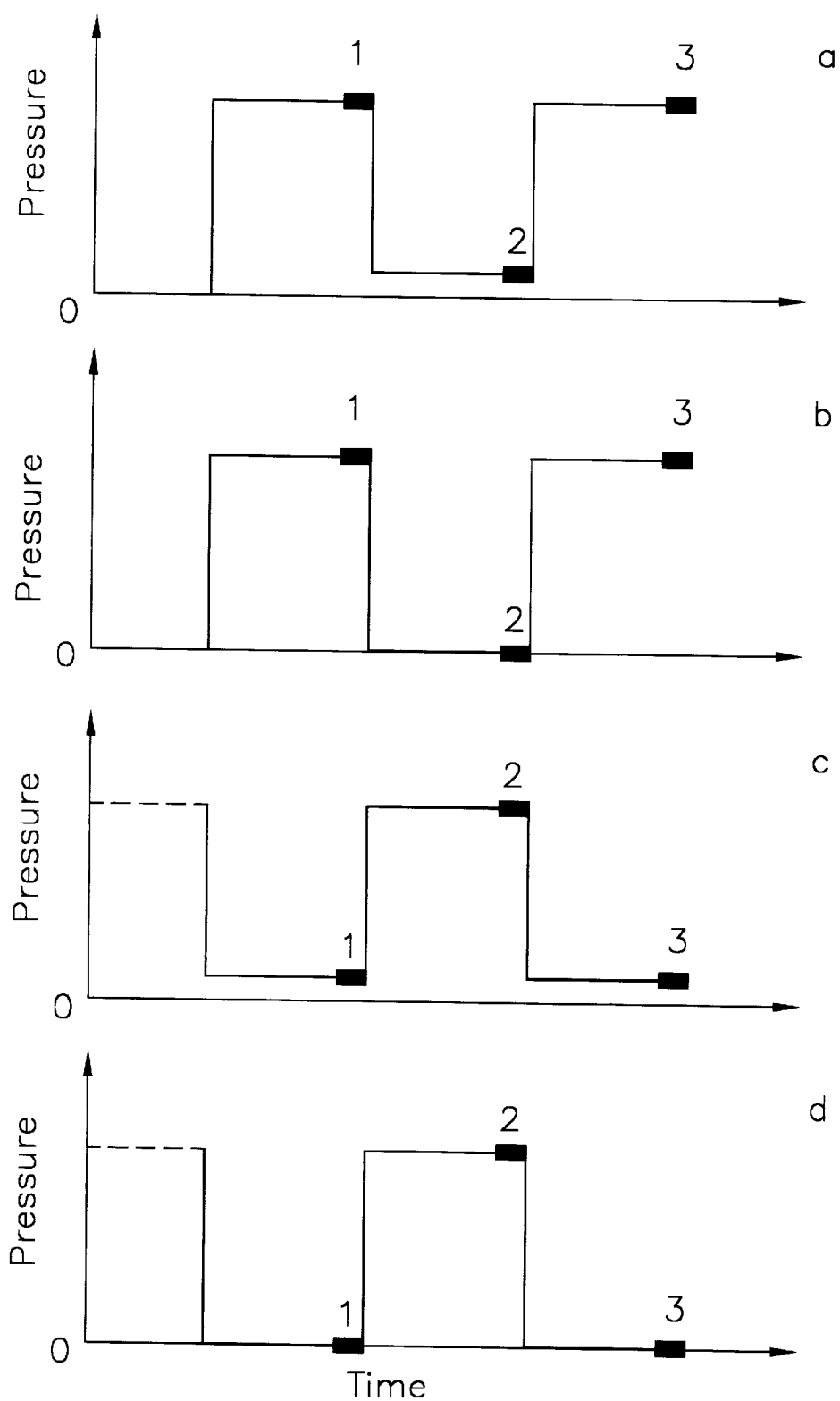
Figure 3:
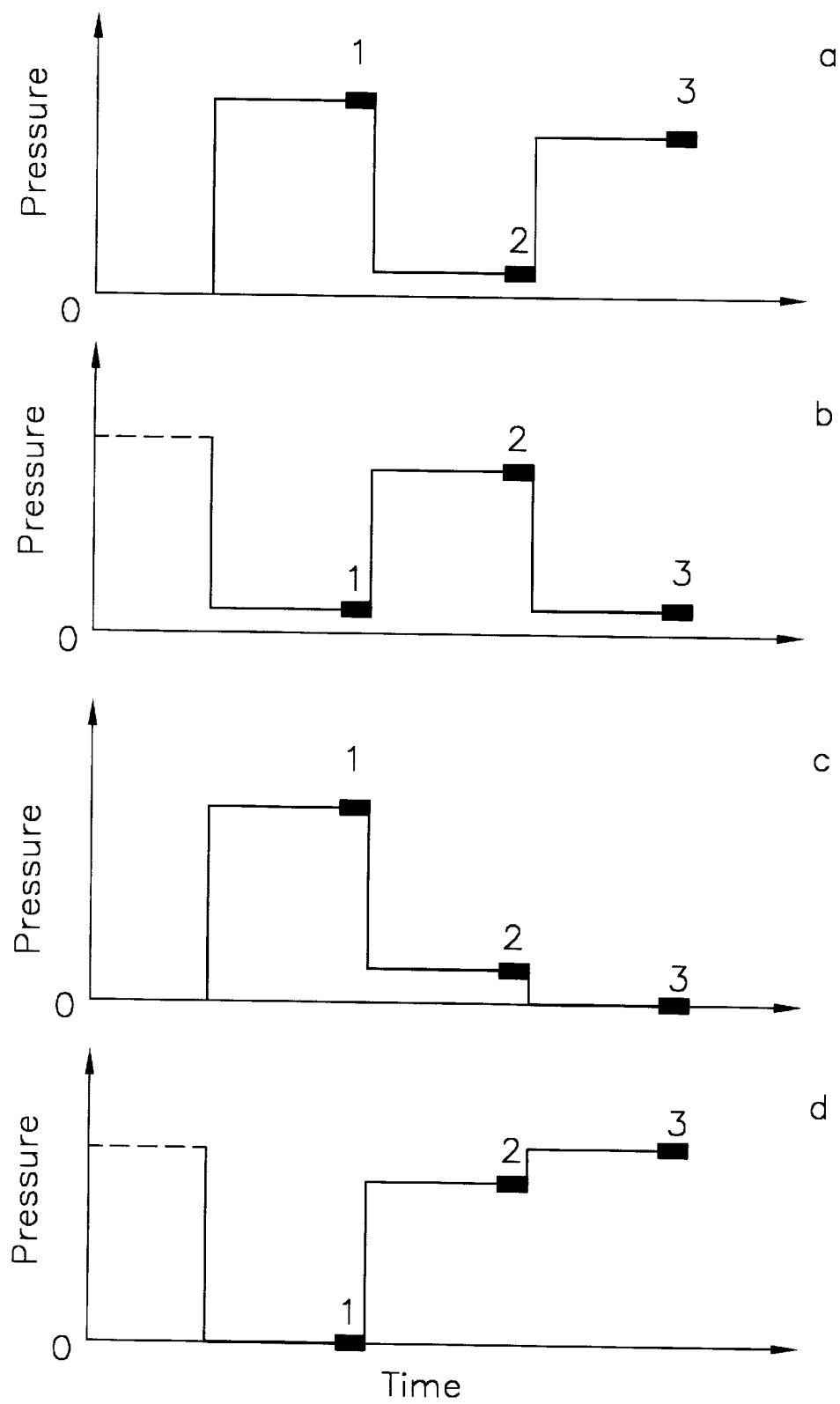
Figure 4:
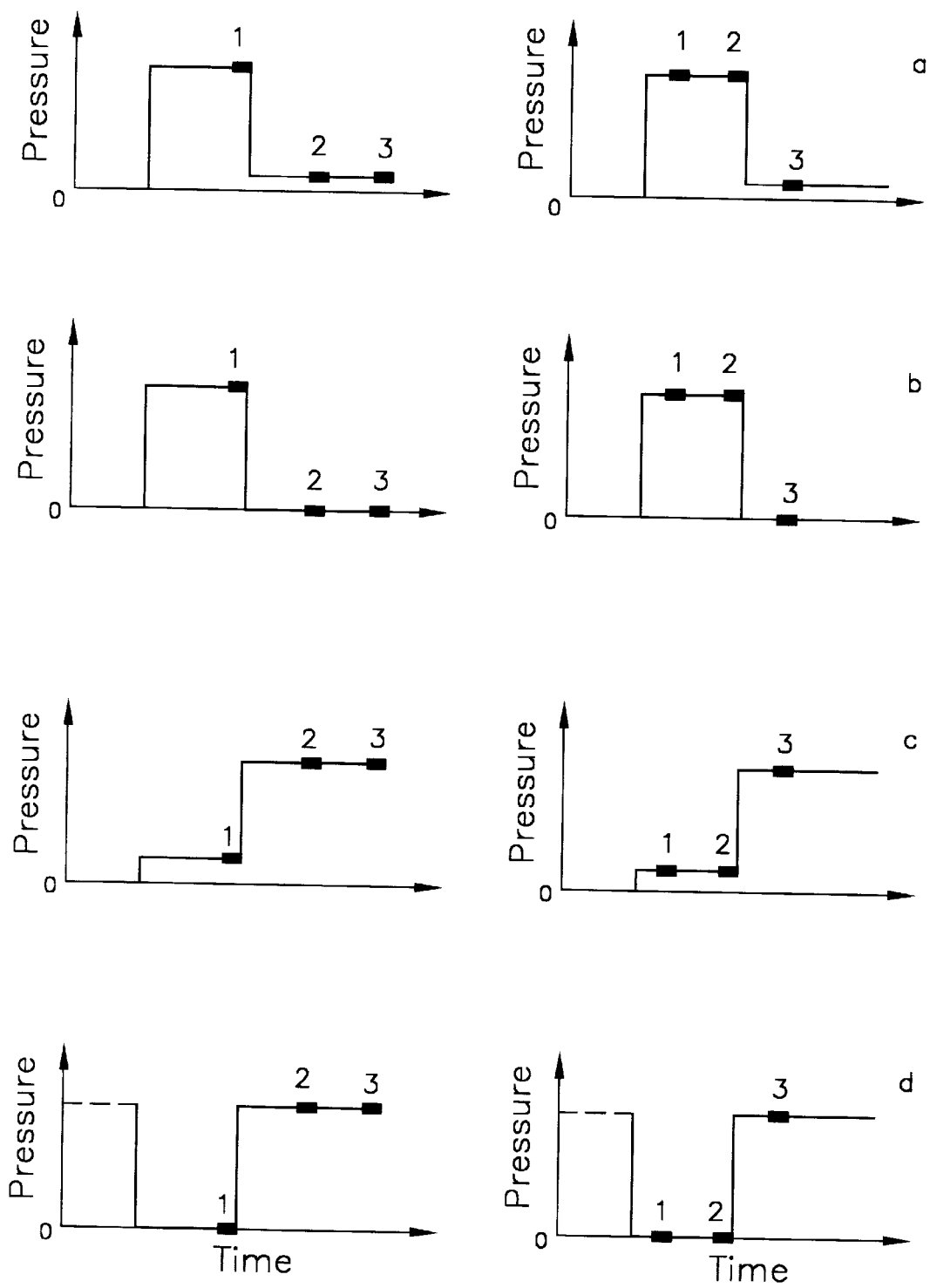

In order to measure the volume changes that are due to a leak, it is necessary to compensate for the temperature-induced volume changes in the product in a pipe system. The present invention compensates for the thermal expansion and contraction of the product in the line without the need to measure the temperature of the product. The method of the present invention improves upon the methods described in U.S. Pat. Nos. 5,078,006 and 5,375,455.

The method for computing the difference in the temperature-compensated volume rate, TCVR, between two pressures, $P_{wt\ avg}$ and $P_2$, during a leak detection test is described in U.S. Pat. No. 5,375,455 and is given by $$TCVR(P_{wt\ avg}-P_2,t_2)=[(VR_1(P_1,t_1)+VR_3(P_3,t_3))/2]-VR_2(P_2,t_2) \quad (1)$$

where the rate of change of volume ($VR_1$, $VR_2$, and $VR_3$) is measured during each of three measurement periods (as denoted by the indices 1, 2 and 3), and where the pressure ($P_1$, $P_2$, and $P_3$) during each measurement period may be different. If a leak is present, the measured volume rate, VR, will include for any measurements made at a nonzero pressure, the volume contributions from both the leak and the thermally induced volume changes. TCVR is computed from the difference in the average volume rate estimated from the measured volume rates in measurement periods 1 and 3 and the volume rate measured during measurement period 2. If no leak is present, then TCVR will be equal to zero, i.e. $(VR_1+VR_3)/2=VR_2$. Any residual volume change that exists is due primarily to the error in temperature compensation. If a leak is present, then TCVR will be equal to the difference in the leak rates that would be measured at $P_2$ and $P_{wt\ avg}$. Both statements are true if the effects of the pressure-induced thermal perturbations are negligible.

$P_{wt\ avg}$ is the pressure at which the flow rate due to a leak is equal to the average flow rate due only to the leak at pressures $P_1$ and $P_3$, i.e., $LR(P_{wt\ avg})=[LR_1(P_1)+LR_3(P_3)]/2$, where the leak rate, LR, is the flow rate due to the leak at the designated pressure. For most testing applications, interpretation of the test result is straightforward because two of the pressures are equal ($P_1=P_2$, $P2=P_3$, or $P_1=P_3$) and one of the pressures is atmospheric or zero gauge pressure. In these tests, the flow rate due to a leak, if one is present, is easily computed at the nonzero pressure. $P_{wt\ avg}$ is also known for tests conducted when $P_1=P_3$. For other testing applications, it will not be possible to determine $P_{wt\ avg}$ without using a model that describes how the leak rate changes with pressure or without additional measurements to quantify this relationship.

As described in Section 1.2.1, Eq. (1) can be interpreted as the difference between (a) the estimated volume change for measurement period 2, $VR_{2\ est}$, at time $t_2$ and pressure $P_{wt\ avg}$, and (b) the measured volume change for measurement period 2, $VR_{2\ meas}$, at time $t_2$ and pressure $P_2$. This is given by $$TCVR(P_{wt\ avg}-P_2,t_2)=VR_2(P_{wt\ avg},t_2)_{est}-VR_2(P_2,t_2)_{meas} \quad (2)$$

If a leak is present, then $VR_{2\ est}$ will be different from $VR_{2\ meas}$ by the incremental volume change due to the leak between $P_{wt\ avg}$ and $P_2$, i.e., $VR_{2\ est}-VR_{2\ meas}= LR(P_{wt\ avg})-LR(P_2)$. If not, then $VR_{2\ est} = VR_{2\ meas}$. In the methods previously presented by Maresca et al., the estimate of $VR_2$ was made from measurements of the rate of change of volume ($VR_1$ and $VR_3$) during the first and third measurement periods.

4.1 Conducting a Leak Detection Test Utilizing the Higher-Order Characteristics of the Volume Data There are other ways, however, to determine $VR_{2\ est}$ at time $t_2$ and pressure $P_{wt\ avg}$ that are more accurate than simply averaging the volume changes in the bracketing measurement periods. First, it is not necessary to use the bracketing measurement periods to make such an estimate. Second, it is not necessary to use three measurement periods to conduct a test. Third, there are better ways to account for the nonlinear changes in the estimate of the volume change at time $t_2$ than averaging the volume changes in the bracketing measurement periods. Thus, any method of estimating $VR_2(P_{wt\ avg},t_2)_{est}$ that accurately accounts for the nonlinear product temperature changes can also be used.

Interpretation of the methods described in U.S. Pat. Nos. 5,078,006 and 5,375,455 as differencing methods, as illustrated by Eq. (2), allows for generalization of these methods and for operational and performance improvements to be made to them. The method of the present invention used to collect and analyze the volume data during a leak detection test requires that (1) a test be conducted at two pressures (2) a measurement of the volume rate be made during a measurement period at one pressure (3) an estimate of the volume rate during that measurement period be made using volume data obtained at a different pressure and an estimate of the second (and/or higher-order) derivative of the volume data describing the thermally induced volume changes that occur between the measurement periods (4) the temperature-compensated volume rate be computed from the difference of the volume changes determined in steps (3) and (4)

Better performance is achieved with this method than with the previous three-segment methods because more accurate estimates of the thermally induced volume changes produced by ambient changes in the product temperature field can be made from the second and/or higher-order derivatives of the measured volume data than from a simple average of the volume changes in bracketing measurement periods. Better performance is also achieved because a test can be conducted using only data that are the least contaminated by the adverse effects of the thermal perturbation produced by changing the pressure during the test. If two measurement periods are used to conduct a test, they can be located and separated sufficiently in time to minimize the adverse effects of the thermal perturbation, but without requiring a test duration that is too long for accurate compensation of the ambient product temperature changes. This is achieved by ensuring that each measurement period is sufficiently distant from a pressure change to minimize the effects of that pressure change.

In the preferred embodiment of the present invention, a test is conducted at two pressures, $P_1$ and $P_2$, and the volume data from two measurement periods, one at each pressure, are analyzed. For the most direct interpretation of a test, it is desirable for one of the pressures to be atmospheric or zero gauge pressure. When this occurs, an estimate of the temperature-compensated volume rate at the non-zero pressure (i.e., the test pressure) can be made. For best performance, the measurement periods should be as distant in time as possible from the preceding pressure changes.

Figure 6:
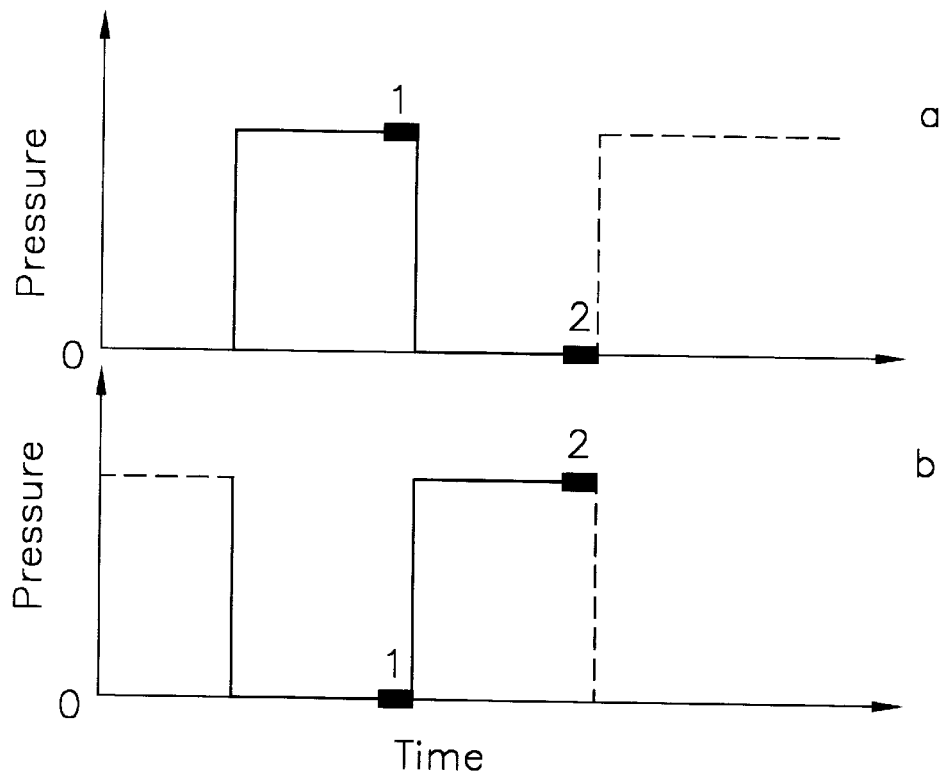
FIG. 6 shows the preferred embodiment of the method used to conduct a leak detection test when circumstances demand an initial pressure change before the test.

FIG. 6 illustrates two simple test configurations that might be used when a pressure change is required before a test. As shown, the time interval between the mid-point of the pressure change and the mid-point of the measurement period is the same for each pressure. This is not a necessary requirement for the conduct of a test, but it is convenient from an operational and interpretational standpoint. The main requirement is that this time interval be long enough to minimize the effects of the pressure-induced thermal perturbations. Such a configuration is typical of how the method might be implemented with a portable system.

Figure 7:
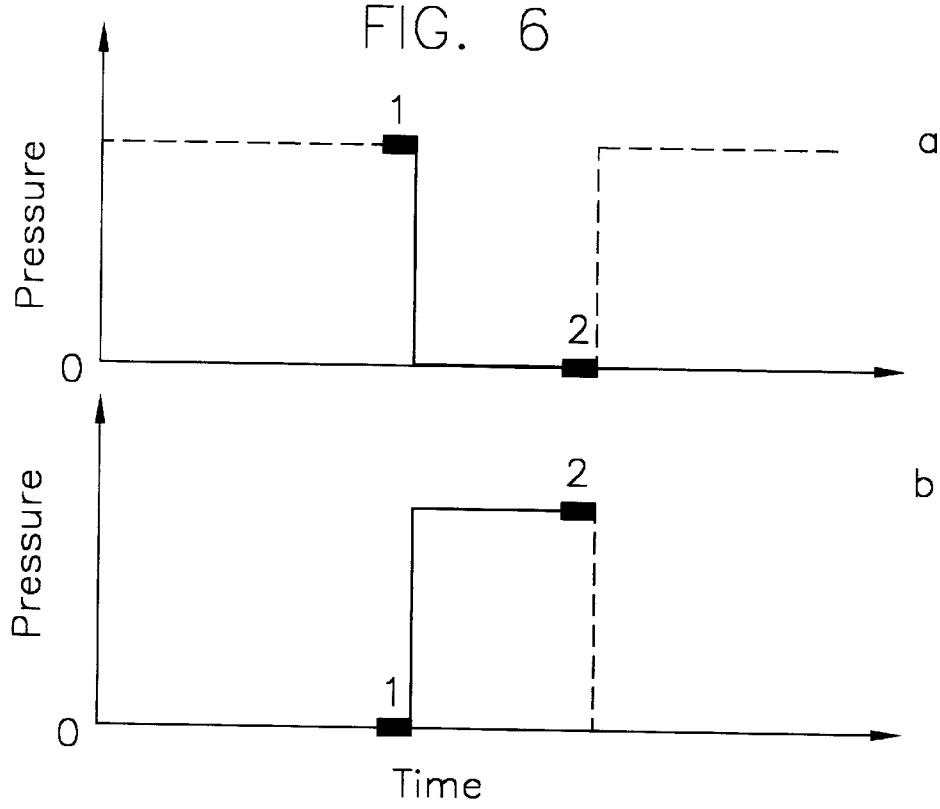
FIG. 7 shows the preferred embodiment of the method used to conduct a leak detection test when no initial pressure change is required, i.e., when the line is already pressurized to the level required to initiate a test.

FIG. 7 illustrates two simple test configurations in which the line is already at the desired pressure for initiating a test and any previous pressure change occurred sufficiently long ago not to impact the test. In both configurations the test period can begin immediately, and the duration of each measurement period can be different. These configurations are typical of how the method might be implemented as an on-line monitoring system.

The measurement periods should be long enough that accurate measurements can be made of the rate of change of volume (i.e., the volume rate) and the second derivative of the volume data. In many types of pipe systems, a measurement period of approximately 20 min is sufficient for accurate test results. Shorter or longer periods may be used depending on the size of the line, the precision of the volume sensors, and the characteristics of the volume data. Although it is not a requirement, measurement periods at different pressures are usually of equal duration, principally for operational convenience and ease of interpretation of the test results.

In the preferred embodiment, the method for computing the difference in temperature-compensated volume rate (TCVR) due to a leak between two pressures, $P_1$ and $P_2$, is given by $$TCVR(\Delta P, t_2) = VR_2(P_1, t_2)_{est} - VR_2(P_2, t_2)_{meas} \quad (3)$$

Where $\Delta P = P_1 - P_2$, the volume rate $VR_{2\ est}$ is made at time $t_2$ and pressure $P_1$ from the volume data obtained at both measurement periods, and the measured volume rate, $VR_{2\ meas}$, is made at time $t_2$ and pressure $P_2$. The estimated volume rate for the second measurement period includes an estimate of the difference in the thermally induced product volume change between the two measurement periods.

In the preferred embodiment, the volume rate measured during the second measurement period is estimated from the rate of change of volume measured during the first measurement period (first derivative of the volume data) and an estimate of the average second derivative of the volume data obtained from both measurement periods. This estimate is given by $$VR_2(P_1, t_2)_{est} = VR_1(P_1, t_2)_{meas} + ((m_1 + m_2)/2) * (\Delta t) \quad (4)$$

where $m_1$ is the second derivative of the volume data (i.e., $d^2V_1(P_1, t_1)/dt^2$) collected during the first measurement period (which is computed from the derivative of the volume rate data, $d[VR_1(P_2, t_1)]/dt$), $m_2$ is the second derivative of the volume data (i.e., $d^2V_2(P_2, t_2)/dt^2$) during the first measurement period (which is computed from the derivative of the volume rate data, $d[VR_2(P_2, t_2)]/dt$), and $\Delta t$ the time between the mid-points of the two measurement periods. The temperature-compensated volume rate computed by differencing the measured and estimated volume rates during the second measurement period is then given by $$\begin{aligned} TCVR(\Delta P, t_2) &= VR_2(P_1, t_2)_{est} - VR_2(P_2, t_2)_{meas} \quad (5)\\ &= [VR_1(P_1, t_1)_{meas} + ((m_1 + m_2)/2)\Delta t] - VR_2(P_2, t_2)_{meas}\\ &= [VR_1(P_1, t_1)_{meas} - VR_2(P_2, t_2)_{meas}] + (m_1 + m_2)/2)\Delta t \end{aligned}$$

Eq. (5) states that the TCVR is determined from the difference between the volume rates measured at each pressure and a correction term for the curvature determined from the second derivative of the volume data. Eq. (5) can be generalized to $$TCVR(\Delta P, t_2) = [VR_1(P_1, t_1)_{meas} - VR_2(P_2, t_2)_{meas}] + NLVCT \quad (6)$$

where NLVCT is the nonlinear volumetric correction term.

There are a number of reasons why this method gives a more accurate estimate of the temperature-compensated volume rate than the earlier, three-segment methods described in U.S. Pat. No. 5,375,455. First, the three-segment method is not designed to compensate perfectly when the second derivative of the ambient thermally induced changes is not constant. The method of the preferred embodiment of the present invention accurately compensates for the ambient thermally induced volume changes when the second derivative of the volume changes is not constant. The two-segment method of the present invention, although designed to compensate for these changes when the second derivative is linear, works well for most product temperature conditions even when the second derivative is not linear.

There are many ways to estimate the correction term in Eq. (6). If the second derivative of the volume changes is not constant, one can use higher-order derivatives to estimate the correction term. For example, the third derivative of the volume changes in each measurement period can be used to estimate the second derivative. Also, estimates of the correction term can be made from any of the volume data collected during a test or by models. For example, one can use the volume data collected at atmospheric pressure to estimate the correction term.

There are a number of standard time series analysis methods for computing the first, second, and higher-order derivatives of the volume data. These time series analysis methods can be applied to the actual measured volume data, or to the same data after some form of smoothing has been applied. Smoothing could be accomplished by averaging the data over time, by using a low-pass filter, or by fitting a curve to the data. (Smoothing is necessary only if the volume fluctuations are large enough to prevent accurate estimates of the derivatives.)

The method, wherein the second or the second and higher order derivatives of the volume data are used to estimate the nonlinear correction term, NLVCT, will very accurately compensate for the ambient thermally induced volume changes. The improvement in accuracy, however, can be offset by the additional data that may be required in order to make reliable estimates of the higher-order derivatives. In practice, the second-derivative method described by Eq. (5) does an excellent job of thermal compensation. If the third derivative must be invoked to compensate for the nonlinear volume changes, then the duration of the measurement period (and the total duration of the test) usually needs to be increased. However, any increase in the duration of the test or a measurement period usually increases the degree of nonlinearity that may be present. This additional nonlinearity can be compensated for provided that an accurate estimate of the third derivative can be made during each measurement period. (If accurate estimates can be made of the third derivative using the same data required to estimate the second derivative, then test performance also improves.)

4.2 Alternative Embodiments of the Three-Segment Method

The two-pressure, three-measurement-period method in U.S. Pat. Nos. 5,078,006 and 5,375,455 specifies that the duration of the three measurement periods be approximately equal, that the intervals between the measurement periods be approximately equal, and that the intervals between each measurement period and the preceding pressure change be approximately equal. One or more of these constraints can be removed, but at the expense of some degradation in the accuracy of the measurement.

The first constraint—that on the duration of the measurement period—can be removed provided that an accurate estimate of the volume changes during each period can be made. It is possible to conduct a test with measurement periods of different lengths; in practice, such an approach would be necessary only if some of the data from a given measurement period were contaminated or missing.

The second constraint—that the intervals between the measurement periods be approximately equal—can be removed provided that the volume change data in each measurement period are properly weighted by time and are measured with sufficient accuracy.

The third constraint—concerning the interval between the measurement period and the preceding pressure change—can also be removed provided that, as with the second constraint, the contribution of the pressure change to the volume change noted during each measurement period is weighted by time. Uneven spacing may be required so the that the interval between a given measurement period and the preceding pressure change can be better maximized.

Eq. (1) can be weighted to allow different spacings between any of the three (or more) measurement periods; for example, this is given by $$TCVR(P_{wt\ avg}-P_2,t_2)=[(a_2VR_1(P_1,t_1)+a_1, VR_3(P_2,t_3))/a_1]-[(a_1+a_2)/a_1)VR_2(P_1,t_2) \qquad (7)$$

where $a_1$ and $a_2$ are the time intervals between the mid-points of measurement periods 1 and 2 and the mid-points of measurement periods 2 and 3, respectively. Unequal intervals between measurement periods may be employed to (1) avoid operational artifacts during a test or (2) increase the temporal spacing between a measurement period and the preceding pressure change without increasing the duration of the test. The latter method can be used to minimize the effects of pressure-induced perturbations.

4.3 Compensation of Pressure-Induced Thermal Perturbations

If the pressure-induced thermal perturbations during the measurement periods are large, a systematic error in the computation of the temperature-compensated volume rate will result. This systematic error is predictable and can be calculated directly using a heat transfer model, estimated directly from the results of actual leak detection tests on nonleaking lines, or estimated by a special test on the line being tested. The data required to estimate the systematic error specified by the second method can be collected on the line to be tested or on other lines. The former approach is only effective when the method is installed on a line (usually a new line) that is verified to be tight using another method of leak detection. The latter approach can be used to test a line of unknown integrity without any calibration data being collected on the line itself.

4.3.1 Model Estimate

A small change in the temperature of a liquid in a pressurized pipe will be produced whenever the pressure in the pipe is changed. These product temperature changes can be estimated empirically, and a heat transfer model can be used to predict the rate of change of temperature due to this temperature discontinuity. Empirical measurements of these pressure-induced thermal changes have been made in an instrumented underground pipe system [Maresca et al., "Pressure and Temperature Fluctuations in Underground Storage Tank Pipelines Containing Gasoline," *Oil and Chemical Pollution*, Vol. 7 (1990)]. The pressure-induced thermal changes were generated by turning the pump that was used to transfer product through the line on and off. With each pressure change, small spikes in the temperature of the product were measured with thermistors that had been inserted into the line. This pressure-temperature effect is a well-known physical phenomenon and has been important in a number of other applications, such as physical oceanography. If the pressure is changed very quickly so that no heat is lost, then an adiabatic change in temperature will occur.

Figure 5:
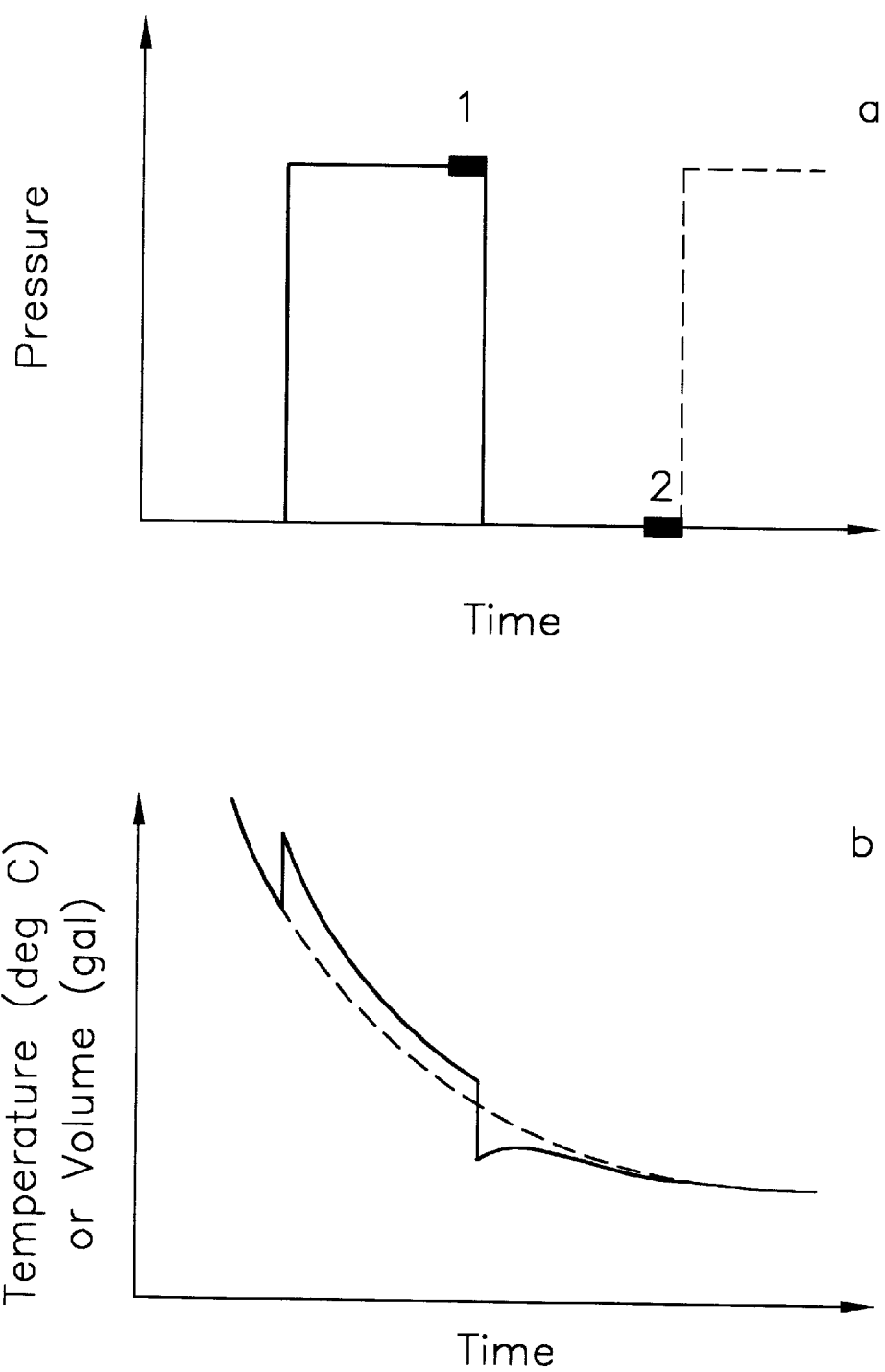

The heat transfer model that was developed and validated under field conditions by Maresca [Maresca et al (1990)] accurately predicts the rate of change of temperature of the product in an underground pipe due to a temperature difference between the product in the pipe and the backfill and surrounding soil. These ambient temperature changes can be very large if the temperature difference is large. This model can be used to predict the rate of change of temperature due to a pressure change in an underground (or aboveground) line. As shown in FIG. 5, the small product temperature change produced by a pressure change immediately attempts to come into equilibrium with the ambient product temperature. If there is enough time between the pressure change and the next measurement period(s), the perturbed temperature field will come into equilibrium with the ambient (mean) temperature field, which process can be accurately compensated for by the methods presented in this disclosure. If the time between the pressure change and the measurement period(s) is too short, then the pressure-induced thermal perturbation may still be present, and if so, will affect the accuracy of the test result.

The model shows that the rate of change of product temperature due to this pressure change is a function of the type of product in the line, the magnitude and duration of the pressure change, and the thermal properties of the product in the pipe, the pipe wall, and the material surrounding the pipe. For a given product and pressure change, the rate of change of product temperature it is mainly controlled by the thermal diffusivity of the material (usually backfill and soil) around the pipe, the thermal diffusivity of the product in the pipe, and the duration and temperature of the previous product transfers. The previous product transfer history is important because it tends to thermally condition the backfill and soil and to control the time constant of the product temperature changes. The thermal properties of the pipe itself are usually small, because the pipe wall is relatively thin. Accurate model predictions can be made for a wide range of pipe systems because the heat transfer in the ground is controlled by molecular conduction, the range of thermal diffusivities of the backfill and soil surrounding the pipe are well bounded, and the conditions under which petroleum product is transferred through piping systems tend to be similar regardless of the type of operation (e.g., hydrant fuel distribution systems at airports, bulk transfer piping at marketing terminals, and pressurized piping at retail service stations).

Once the product temperature changes are known, then the effects on volumetric tests can be determined. For a volumetric test, the thermally induced volume changes are proportional to the rate of change of temperature, the volume of product in the line, and the coefficient of thermal expansion of the product. For a given type of line and a given type of product in the line, the magnitude of this pressure-induced thermal perturbation is mainly dependent on the magnitude of the pressure change, the volume of product in the line, and the time between the pressure change and the measurement period. For small lines tested under small pressure differences, like those lines found at bulk fueling facilities, this effect can be made negligible. As mentioned above, this is accomplished by increasing the time interval between a measurement period and the pressure change preceding it. This effect was measured in many leak detection tests on an underground line over a wide range of product temperature and ground temperature conditions. For pressure changes of 50 psig in a 1,700-gal line, the effect is approximately 0.02 gal/h. This effect cannot always be neglected if the pressure difference is large or if the volume of the product in the line is large. This is almost always true for airport hydrant fuel distribution lines. In this case, the systematic error can be large and can adversely impact the results of a leak detection test.

The magnitude of this systematic error (bias) on the method of leak detection described in this disclosure and the prior-art patents can be predicted with the heat transfer model. First, the model is used to predict the product temperature conditions, which include the effect of product transfers immediately prior to a test, when the temperature of the product differs from that of the backfill and soil, and then to predict the effect of the pressure changes required to implement the method of leak detection described in this disclosure and previous prior-art patents. Second, the volume changes resulting from the product temperature changes are then calculated for the volume of product in the line. Finally, the temperature-compensated volume rate is calculated using the method described in this disclosure and the prior-art patents. The temperature-compensated volume rate is equal to the systematic error, because if no pressure changes occurred during the test period and the method described in this disclosure and prior-art patents were used to compute the temperature-compensated volume rate, then the computed rate would be zero. The systematic error can be calculated for these methods, because they accurately compensate for the ambient product temperature changes that are normally present. The same modeling approach would work for any method that accurately compensates for the ambient product temperature changes.

4.3.2 Data Estimate

This systematic error can also be estimated from the results of leak detection tests on actual lines, provided that they are not leaking, using the methods described in this disclosure. The measured temperature-compensated volume rate contains three volumetric contributions: (1) the systematic error due to the pressure changes during and before the test, (2) the residual error in compensating for the ambient thermally induced volume changes, and (3) the random measurement error inherent in the instrumentation. The latter two errors can be easily minimized, so that a direct measurement of the systematic error can be made. The random instrumentation error can be minimized by averaging a number of tests together. The residual error in compensation can be computed from the test error, which is derived by applying the method when the pressure is a constant over all measurement periods. While the heat transfer model indicates that the backfill, product and transfer conditions will affect the magnitude of the systematic error, accurate estimates can be made for many different types of petroleum operations because the backfill, product, and transfer conditions are very similar. This is especially true for major airport hydrant systems in which product is continuously transferred through the lines for approximately 19 h each day.

Estimates of the magnitude of the systematic error have been compiled from many leak detection tests on nonleaking lines as a function of pressure and line volume. This correlation includes tests throughout different regions of the country and different seasons of the year. The correlation shows that the systematic error is proportional to pressure and volume. This type of estimate could also be made on the line to be tested, once it is known to be leak free. Such an estimate is best derived on new lines or for on-line monitoring systems.

4.3.3 Direct Measurement

Figure 10:
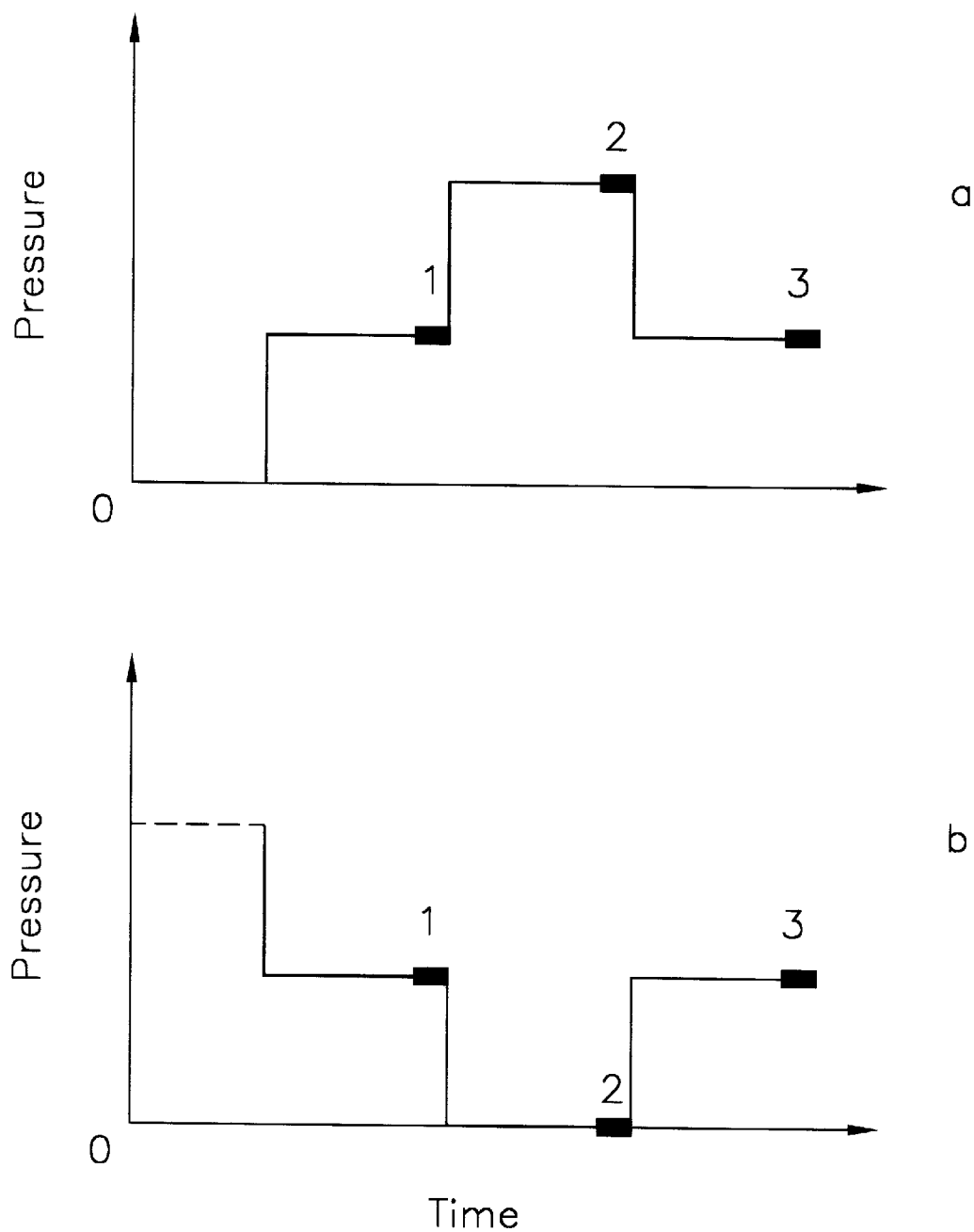
FIG. 10 shows two measurement sequences to estimate the systematic bias error produced by pressure-induced thermal perturbation.

A special test comprised of three measurement periods can be conducted to estimate the magnitude of the systematic error. This systematic error can be estimated in this special test even if the line has a leak of unknown rate. The systematic error can be computed by differencing the results of two separate leak detection tests using the two-segment method described in this disclosure and one of the two three-pressure test configurations shown in FIG. 10. The pressure test configurations require an initial pressure change that is equal to 50% of the lowest and highest pressures. The first test is conducted at the first two pressures, and the second test is conducted at the last two pressures. The difference in the temperature-compensated volume rates is equal to the systematic error for this pressure difference. The results of either leak detection test are determined by subtracting (or adding) the measured systematic error. This testing procedure can suffice as a leak detection test if the pressure difference is large enough or the bias from this measurement can be scaled in proportion to pressure for a test conducted over a different set of pressures. As illustrated in FIG. 10, the three-pressure test can be initiated at the lowest pressure (FIG. 10a) or the highest pressure (FIG. 10b). (The pressure increments are equal so that the method will work even if the line is leaking and no accurate model exists to calculate how the leak changes in that line as a function of pressure.)

While the systematic error can be determined for the line being tested, this procedure increases the time required to complete a test, and thus, is best applied once the line is declared leaking. The special three-pressure test would be conducted between the highest and lowest pressures of the leak detection test and would utilize the last pressure and measurement period of the actual leak detection test as the first pressure and measurement period of the special test. The systematic error measured in this special test would be 50% of the systematic error required to correct the leak detection test.

4.3.4 Minimizing the Pressure-Induced Thermal Perturbation

The systematic error produced during a test by pressure-induced thermal perturbations can be compensated for by any of the methods described in Sections 4.3.1 through 4.3.3. Another approach is to minimize the magnitude of the systematic error so that it is small enough to be negligible in a specific testing application. A number of ways for reducing the magnitude of this systematic error were discussed in Section 1.2.2. As stated in that section, the error can be reduced in any of four ways: by reducing the volume of the product in the line being tested, by reducing the pressure differential used in testing the line, by reducing the number of pressure changes required for a test, and by increasing the time between any pressure change and the subsequent measurement period.

All four ways are compatible with the method presented herein. The first two are not method-related, yet they can produce significant benefits in method performance. The last two, which are method-related, can be applied with good results because the method requires only two measurement periods and one pressure change. For optimal results, the time intervals between a pressure change and the subsequent measurement period need to be maximized, and the time intervals between measurement periods need to be minimized. This is most easily accomplished by using a test with only two measurement periods. This means that for a given test duration the measurement periods are positioned as illustrated in FIGS. 6 and 7. This approach to minimizing the systematic error works well provided that the test duration is shorter than the amount of time required to completely minimize the error due to both the pressure-induced thermal perturbation and the ambient thermal changes. If the test duration is too long, then several estimates of the TCVR should be made, each based on a different measurement-period configuration, until the test error has been minimized. The heat transfer model described in Section 4.3.1 or the test data discussed in Section 4.3.2 can be used to determine and verify the appropriate parameters, in terms of line volume, pressure change, and test duration, for minimizing the error. This approach is particularly effective for small lines, and, if they are not too large, for lines operated at low pressures.

Since the systematic error occurs because the perturbed temperature field at one or both pressures has not come back into equilibrium with the ambient temperature field, another minimization approach is to extrapolate the volume or volume rate data by using a model or by curve-fitting until the perturbed temperature field is approximately in equilibrium with the ambient temperature field. Then, the TCVR can be computed using the extrapolated data. This approach has the net effect of increasing the duration of the test without actually physically doing so.

4.3.5 Summary

In summary, the magnitude of the systematic error produced by pressure changes during a test can be estimated from a model calculation, test results from many different nonleaking lines, test results from the line to be routinely tested once it is verified to be leak free, and by a special test on the line being tested, even if it has a leak. This estimate of the systematic error is then subtracted from the test result computed using the method of this disclosure or the methods of the prior art patents. Another approach is to minimize the magnitude of the error by judicious selection of the time intervals between measurement periods and those between measurement periods and pressure changes. This approach is particularly effective for lines with small volumes that operate at low pressures.

4.4 Estimating the Error in the Temperature-Compensated Volume Rate

The accuracy of a test using the method described in this disclosure depends primarily on the accuracy of compensating for the nonlinear product temperature changes that occur during that test. The error in the temperature compensation can be estimated for a given test by several different means.

The first is to conduct a leak detection test immediately before or after the actual leak detection test but without changing the pressure. In practice, this means that additional data are collected either before or after the completion of a leak detection test at the same pressure used initiate the test or the same pressure used at the completion of a test. This error estimate mainly indicates how well the ambient product temperature changes have been compensated for, but does not include the error due to the uncompensated pressure-induced thermal perturbations. This method of estimating the test error for a test with three or more measurement periods is more fully described in U.S. Pat. Nos. 5,078,006 and 5,375,455.

The second, which includes the error due to both the ambient product temperature change and the pressure-induced thermal perturbation, can be calculated using the volume data collected during a test. This estimate is made by differencing the results of a two-pressure, two-segment test with the results of a two-pressure, three-segment test of the same duration, where the third segment is located between the other two segments. If this difference is small or approximately zero, then it can be concluded that the effects of both thermal errors are negligible. If the difference is not small, this error estimate should be interpreted only as an upper bound on the error, because the middle segment of this test may be contaminated by the pressure-induced thermal perturbation more than the two end segments. If the effects of the pressure-induced thermal perturbations are negligible, then any nonzero estimate is a direct measure of the compensation of the ambient product temperature changes.

The third is to compute the error directly from the higher-order derivatives of the volume data. Eq. (5) uses the second derivative of the volume data in two measurement periods to estimate the nonlinear volume change. The error can be computed using the third- and higher-order derivatives of the volume data. If the third derivative of the data were a constant, then the error for this implementation of the method, except for sensor measurement error, would be zero. If not, then the error is the difference between the volume changes estimated using the second derivative and the volume changes estimated using the third (and higher-order derivatives). The accuracy of this error estimate is dependent on the precision of the sensors and the duration of the measurement period. If the third derivative of the volume data is known to be a constant, then the error in the temperature-compensated volume rate can be computed using only the third derivative. This is given by $$[d(m_1)/dt+d(m_2)/dt]*0.5*(\Delta t)^2 \qquad (8)$$

The fourth is to estimate the maximum acceptable error for a test, which includes both thermal effects, from the difference in the rate of change of the volume changes (second derivative of the volume data) measured during each measurement period of a two-pressure, two-segment test. Large differences mean that the volume and volume-change data are highly nonlinear. The error is a percentage of this total volume change, usually 1 to 10%. If any of these errors are too large, then the leak detection test should be repeated before a reliable decision about the status of the line can be made.

A number of other data quality checks can be made to verify that the underlying assumptions of a test are valid. One such test is to verify that the measured volume changes in successive measurement periods at the same pressure, or when the second pressure is lower than the first pressure, decrease in magnitude over time and do not change sense. Again, if the data fail any of these data quality checks, the test should be repeated.

5 DESCRIPTION OF AN ALTERNATIVE EMBODIMENT OF AN APPARATUS TO IMPLEMENT THE METHOD

Four different general types of apparatuses were described in U.S. Pat. Nos. 5,090,234; 5,163,314; 5,170,657; and 5,189,904 that could be used for implementing the methods of leak detection for a pressurized pipe system described in U.S. Pat. Nos. 5,078,006 and 5,375,455. In addition, a simplified apparatus for implementing these methods was described in U.S. Pat. No. 5,415,033. All of these apparatuses can also be used with the improved methods of data collection and analysis described in the present disclosure. In general, these apparatuses are used to maintain the pressure in the line at a constant level during each measurement period and to measure the volume changes in the line during said period. These apparatuses can also be used to raise or lower the pressure in the line for the conduct of a test. Additional sensors and appurtenances were added for safety, redundancy and environmental compliance.

Figure 8:
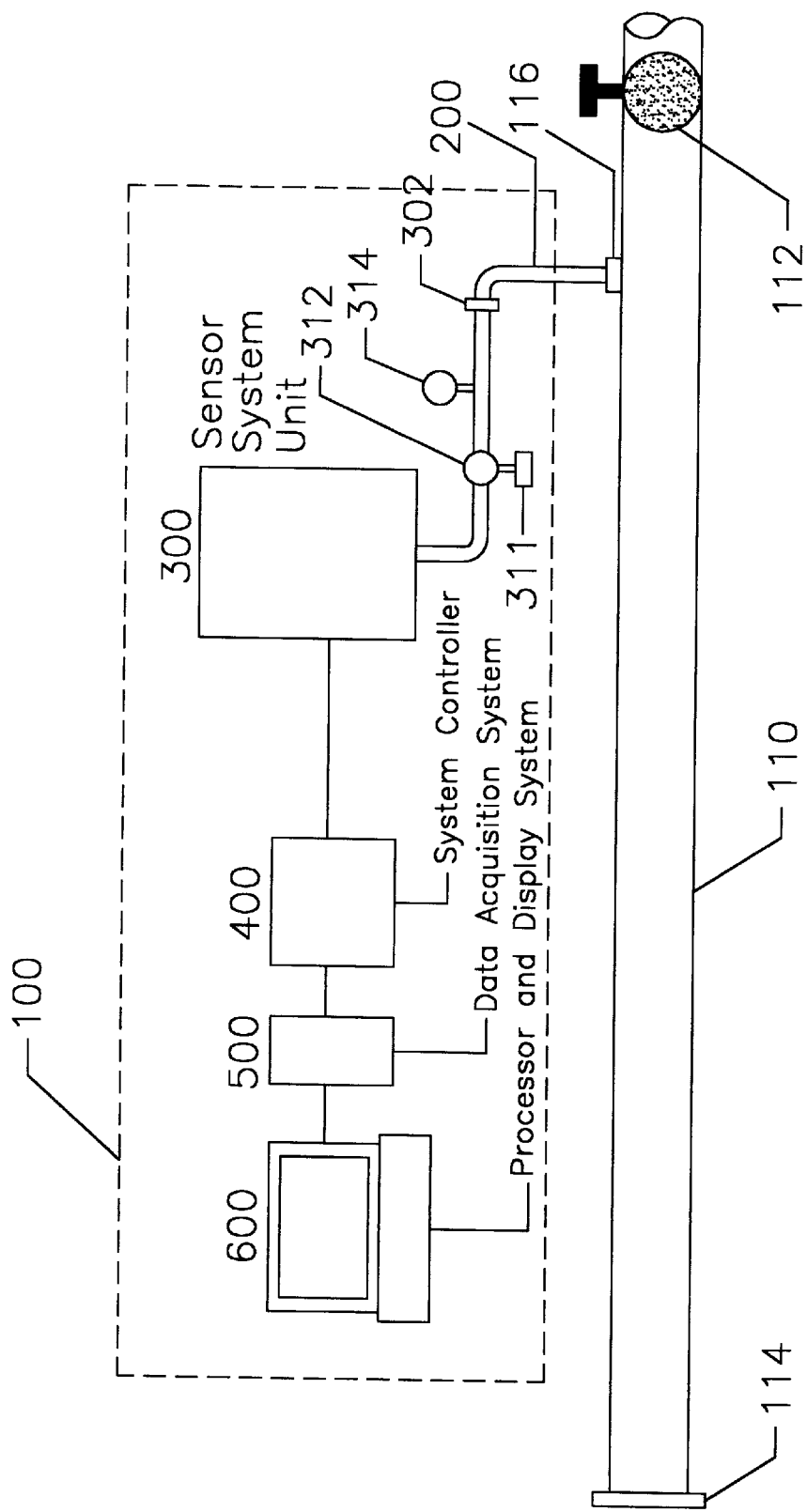
FIG. 8 is a schematic diagram of a simplified embodiment of an apparatus for conducting a leak detection test on a pressurized pipe system containing a liquid product.
Figure 9:
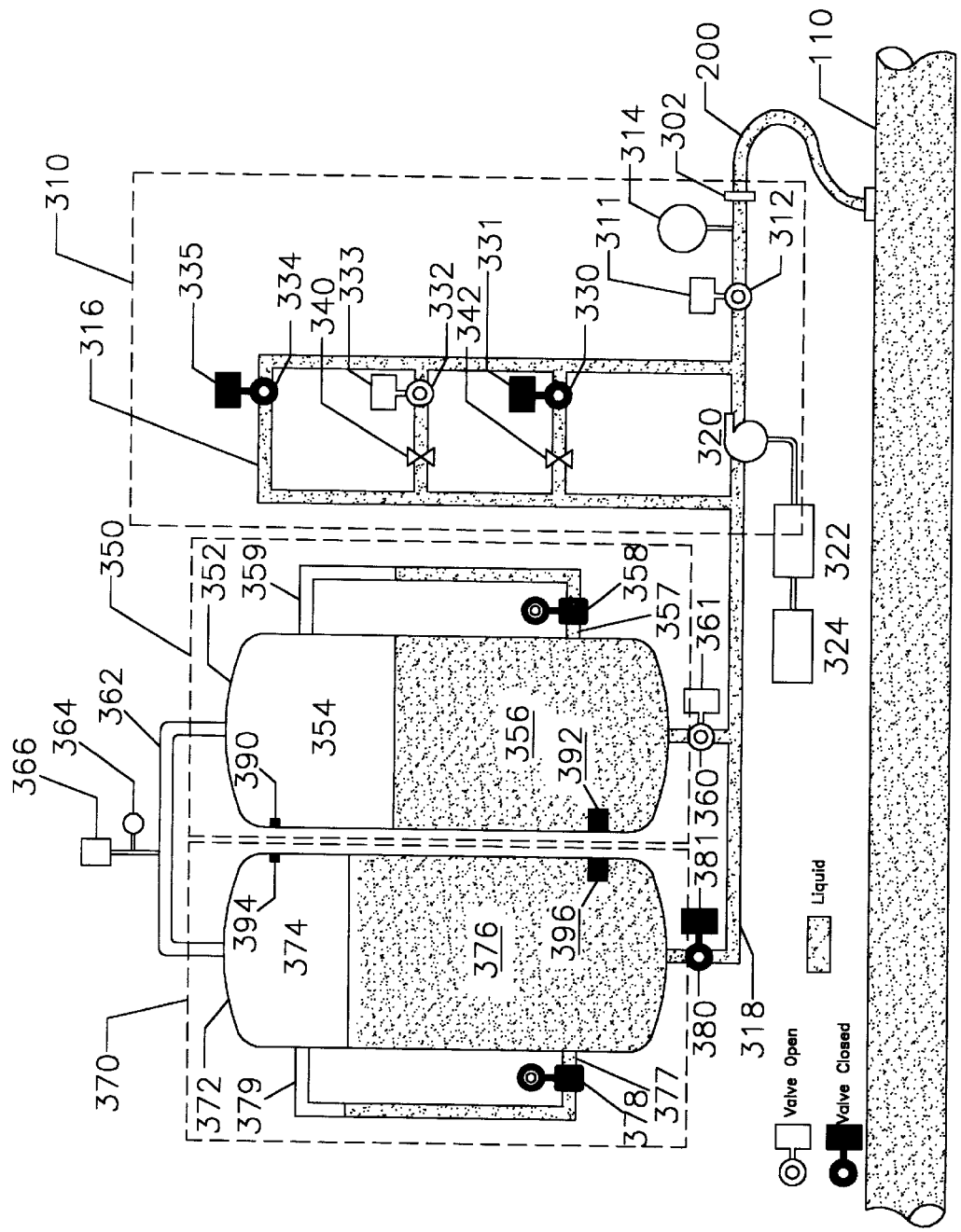
FIG. 9 is a schematic diagram of a simplified embodiment of the sensor system unit of a pump apparatus used for conducting a leak detection test on a pressurized pipe system containing a liquid product.

A simplified apparatus for implementing all of the previous methods of leak detection, as well as the improved method described herein, is shown schematically in FIGS. 8 and 9. This apparatus is an improved embodiment of the positive-displacement pump apparatus described in U.S. Pat. No. 5,090,234. This apparatus maintains the pressure at an approximately constant level during each period by adding liquid to or removing it from the line by means of a simple and efficient pressure management system, which is the pressure management ladder system 310 shown in FIG. 9. (This liquid is usually the liquid in the line, but for some applications, it may be a different liquid.) This embodiment eliminates the need to use a two-way pump to add or remove product for the purpose of managing pressure during a test. The embodiment is comprised of (1) a one-way (variable-speed or constant-speed) pump to add product to and thereby increase pressure in the line and (2) a pressure relief valve system to remove product from and thereby decrease pressure in the line. For best results, constant pressure should be maintained through continuous operation of the one-way pump.

This pressure management system 310 has several important advantages over the two-way pump system. It is simpler, more efficient, and less expensive. While the one-way pump does not need to be run continuously during a test, continuous operation does allow for better pressure control during the measurement periods. It also eliminates the small perturbations in the volume data that result each time the pressure is adjusted. This results in improved accuracy. Better pressure maintenance is particularly important when testing large lines; the larger the line, the more important it becomes. The method of maintaining pressure can also be important when testing small lines. The continuous pressure adjustments featured in the pressure management system 310 make it possible to test lines of all sizes. FIG. 8 shows the main components of the apparatus, and FIG. 9 describes the sensor system unit in more detail.

5.1 Description of the Apparatus

The leak detection system 100 shown in FIG. 8 consists of four main components: (1) the sensor system unit 300, (2) the system controller 400, (3) the data acquisition system 500, and (4) the processor and display system 600. The leak detection system 100 is connected to the pipe 110 that is to be tested for leaks through a connection pipe or a flexible hose 200. The pipe 110 is isolated from other piping and tanks by either a valve 112 that completely seals when closed or a blind flange 114. Depending on the pipe system, the two ends of the pipe section may be closed off with valves or with blind flanges (referred to as valve blinds), or with a combination of the two.

The connection hose 200 allows liquid communication between the pipe 110 and the sensor system unit 300. In practice, it is convenient to install a mechanical valve at the end 302 of the sensor system unit or where the connection pipe or hose 200 is attached to the line 116. This mechanical valve provides added safety when these connections are made. When a portable implementation of the sensor system unit 300 is used to test the line, a valve located on the line at a permanent connection point 116 simplifies the connection process.

The sensor system unit 300 is controlled by the system controller 400, the data acquisition system 500, and the processor and display unit 600. The system controller may consist of a programmable logic controller (PLC) or one of many commercially available controller units. The controller system is used to operate the sensor system unit (e.g., open and close the motorized and solenoid valves on the sensor system). When the system controller is programmable, all of the instructions and control are provided by the controller unit 400; otherwise, the processor unit 600 provides the instructions to the system controller 400, and the system controller executes them. The data acquisition unit 500 may consist of a data acquisition card for use in a computer or other processor unit, or a commercially available data acquisition system. The data acquisition system could also be part of the processor and display unit 600 or part of the system controller 400. The processor unit 600 could be a general purpose computer or a special purpose processor, such as a microprocessor.

Also shown in FIG. 8 is a pressure sensor 314, a valve 312 and a motorized valve control unit 311 to open or close the valve. The valve 312 is used to allow or prevent liquid communication between the pipe 110 and the sensor system unit 300. The valve shown in FIG. 8 is a motorized valve, but other types of electronic valves can be used (e.g., solenoid valves). A manually operated valve could also be used. The pressure sensor 314 is an electronic sensor that is used to measure and control the pressure in the pipe system during a test. A mechanical pressure gauge can be added in the vicinity of valve 312 to provide a visual reading of the pressure during setup, repair or maintenance activities. A second pressure sensor and/or mechanical gauge can be added on the sensor system unit 300 side of valve 312 to measure the pressure of the sensor system unit when valve 312 is closed.

FIG. 9 shows the sensor system unit 300 in more detail. This unit is used to manage the pressure and to measure the volume changes required to maintain or change pressure during a leak detection test. The sensor system unit 300 is comprised of three subsystems: (1) a pressure management ladder 310, (2) a measurement cylinder 350, and (3) a storage container 370. The ladder unit 310 is used to measure, change, and control the pressure of the line. The measurement cylinder unit 350 is used to measure the change in volume of liquid 356 (in the container 352) that is added to or removed from the line 110 in order to maintain a constant pressure during a test. If the line is small enough, the measurement cylinder 352 will also accommodate the product added or removed in order to raise or lower pressure in the line 110. If not, additional space is provided by the container 372 in the storage container unit 370. When there is a large leak or when thermal changes are great, commensurately large adjustments in liquid level must be made in order to maintain constant pressure; thus, the storage container 372 may also be used to supplement the measurement container's capacity for storing or receiving additional liquid. If the storage container 372 is used, accurate measurements of the volume changes occurring therein must be made. As an alternative to such measurements, valve 312 can be closed and liquid can be added to or removed from the measurement container 352, but the test must be interrupted in order to do so; then valve 312 must be re-opened and the test resumed. The use of a level sensor in the storage unit 370 eliminates the need for such interruptions.

In general, the storage container unit 370 is used to change the pressure in the line. It also serves as a reservoir of additional liquid and storage space that may be needed during a leak detection test. When instrumented as shown in FIG. 9, the storage container unit 370 can also be used in place of the measurement cylinder unit 350.

When the apparatus 100 is used as a portable system, the storage container unit 370, if one is needed, is preferably a unit that is nearly identical to the measurement cylinder 350.

This allows for redundancy and ease of manufacturing. However, this need not always be the case. When more accurate measurements of the level changes are required, one can use a smaller-diameter container 352 in the measurement cylinder unit 350 rather than using a higher-precision sensor 358. When the apparatus 100 is an online system, or when very large volumes of product are required to conduct a test, the storage container 370 may be replaced or supplemented with another section of piping, a tanker truck, or an underground or aboveground storage tank.

A differential pressure sensor 358 is used to measure the level changes in the measurement container 352. The sensor is connected to the container with tubing 357 that communicates with the liquid 356 in the measurement container 352 and with tubing 359 that communicates with the gas 354 in the top of the measurement container 352. While a differential pressure sensor 358 is preferred, any level sensor that has the required precision and accuracy can be used. If the differential pressure sensor is sensitive to temperature changes, a temperature sensor can be added to the body of the differential pressure sensor or in the immediate proximity of the sensor to correct for these temperature changes. The same configuration (a differential pressure sensor 378 with tubing 377 and 379) is used to measure the changes in the level of liquid 376 in the storage container 372.

For simple interpretation of the level changes in terms of volume changes, the section of the measurement cylinder used to measure the level changes should have vertical walls (e.g., an upright cylinder). A container with a variable cross section (e.g., a horizontal cylinder) can be used provided that a strapping chart or conversion table for the container is available or can be developed by calibration. In the preferred embodiment, a tank with a constant cross section is used. Calibration of the level sensors is easily accomplished using a small valve that is added to the end 302 of the sensor system unit 300 or at another location on the sensor system unit 300, e.g., on either side of the valve 312, between the measurement container 352 and the valve 360, or between the storage container 372 and the valve 380, or on connection pipe 318.

In the preferred configuration, both containers 352 and 372 are maintained at the same pressure through the connection pipe 362. This pressurization is at low levels and is unrelated to the pressurization of the line. A conservation vent 366 (or breather valve) is used to keep the pressure low (generally at atmospheric pressure) and approximately constant. The pressure sensor 364 is used as a monitor to prevent overpressurization of the containers. If the pressure becomes too great (for example, due to a malfunction of the processor unit 366), the processor unit 600 alerts the operator and the valves 360 and/or 380 will close automatically. As shown in FIG. 9, the pressure sensor 364 is electronic. A mechanical pressure gauge can also be added for field checks, or, in some applications of the system 100, a mechanical gauge can be substituted for the electronic sensor.

For some applications, these containers may have to be placed under pressure with a gas such as nitrogen 354, 374. In that case, the conservation vent 366 would be replaced with another type of pressure relief valve. Technically there is no need to have the gas in the measurement container communicate with that in the storage container. Thus, the connection pipe 362 can be removed and a separate conservation vent 366 and/or pressure sensor 364 can be used for each tank.

A level-sensing switch 390 located on the inner wall of the measurement container 352 prevents overfilling of the container by alerting the operator when the level of liquid reaches a certain height. If the level of liquid 356 gets too high, the valve 360 will close electronically, and valve 380 will open, allowing continuous operation of the unit 100 during a test. Alternatively, if the level in either container is insufficient to conduct a test, valve 312 (which isolates unit 300 from the line 110) can be closed and the levels adjusted; valve 312 is then reopened and the test continues. Another level-sensing switch 394 is used in the storage container 372.

In addition to these "high-level" alarms, "low-level" alarms 392, 396 can be added to the containers 352, 372 to prevent the level of liquid from getting too low. When the level of liquid drops below a certain point, air (or another gas) can be sucked into the ladder unit 310. Indications of level, both high and low, are also given by the level sensors 358, 378 attached to each container.

The ladder unit 310 adds product from the container(s) 352, 372 to the line 110 by means of the pump 320; it also removes product from the line through a pressure-relief valve that is set to open when the line reaches a fixed and known pressure. The two valves 340, 342 located on the middle and bottom rungs, respectively, of the ladder unit establish the high and low pressures for a test. One, valve 340, is set to open whenever the higher test pressure is exceeded, and the other, valve 342, is set to open whenever the lower test pressure is exceeded. If the lower pressure is atmospheric, the bypass valve 334 at the top of the ladder opens electronically and stays open for the duration of the measurements at atmospheric pressure. In FIG. 9, three electronic valves are shown on the ladder unit 310; in the preferred embodiment, the two valves 330 and 332 in proximity to the low-pressure and high-pressure relief valves 340 and 342 are controlled by solenoids 331, 333.

The valve 334 at the top of the ladder unit 310 is operated by a motor 335. The motorized valve 334 is used to isolate the line from the measurement and storage containers or to allow liquid communication between the line and either of the containers 352, 372. Whenever the lower pressure must be maintained (i.e., by the valve 342), valve 330 on the bottom rung is opened and valves 332 and 334 on the upper rungs are closed. Whenever the higher pressure must be maintained (i.e., by the valve 340), valve 332 on the middle rung is opened and valves 330 and 334 on the top and bottom rungs, respectively, are closed. When direct communication is required between the liquid in the line and that in the container(s), valve 334 on the top rung is opened and valves 332 and 334 on the lower rungs are closed. (Additional pressure relief valves and solenoid valves can be added to the ladder if a test requires the use of more than two pressures.)

The pump 320 can be either a constant-speed or a variable-speed pump. The pressure sensor 314 determines when product must be added to the line (i.e., whenever line pressure decreases). The controller system 400 reads the pressure measured by the sensor 314 and instructs the starter 324 to turn on the pump motor 322.

5.2 Operation of the Apparatus During a Leak Detection Test

A description of a leak detection test conducted at two pressures and comprised of two measurement periods is provided below. It is assumed that the first measurement period is conducted at the higher pressure level but that line pressure is below that level prior to the start of the test. The processor 600 initiates the test sequence. In the preferred embodiment, the data from the pressure sensor 314, the differential pressure sensors 358, 378 and other sensors are collected continuously throughout the test by the data acquisition system 500, but in computing the difference in temperature-compensated volume rate (TCVR) between two pressures only the data collected during the measurement periods are analyzed.

The description of the test focuses on the operation of the sensor system unit 300. During a test, all instructions and controls (i.e., opening and closing valves, changing the pressure, starting the pump, etc.) are accomplished by means of a PLC system controller 400. Use of such controllers is well known in the art. Actual tests can differ from the description provided here depending on the pressure sequence, the line configuration, and the exact components comprising the system 100.

Initially all the valves in the sensor unit 300 are in a closed position such that the unit is isolated from the pipe system that will be tested. Valve 312 is then opened to allow liquid communication between the line and the sensor system unit 300. Pressure in the line is monitored by the pressure sensor 314; the level of liquid in the measurement container 352 is monitored by the differential pressure sensor 358 and that in the storage container 372 by the differential pressure sensor 378. The next step is to initialize the level of liquid in the measurement and storage containers. Liquid in the two containers may be brought to the same level by opening valves 360 and 380 at the bottom of the respective containers 352 and 372. Or, if the liquid in the measurement container 352 is much higher than that in the storage container 372, the product needed to raise line pressure before starting a test might be obtained from that container (352) by opening valve 360. Ideally, the storage container 372 should both (a) contain enough liquid product to raise line pressure to the higher of the two levels required for the test and (b) have the capacity to receive whatever amount of liquid product must subsequently be withdrawn from the line in order to achieve the lower of the two pressures. The measurement container 352 too should both (a) contain enough liquid product to add to the line so that constant pressure can be maintained during a measurement period and (b) have the capacity to receive whatever amount of product must be withdrawn from the line for the same purpose, regardless of volume changes due to a leak or to thermal expansion and contraction of the product.

Once the levels in the two containers have been initialized, the line can be brought to the higher of the two pressures required for a test. Assuming that the storage container 372 is used to raise or lower the pressure and that the measurement container 352 is used to maintain that pressure once it is reached, liquid is removed from the storage container 352 by the pump 320. Valve 380 is opened and valve 360 is closed (or checked to verify that it is in the closed position). The starter 324 turns on the pump motor 322, and the pump 320 pushes liquid into the line until the pressure sensor 314 indicates that the first test pressure has been reached. During this pressurization sequence, air is brought into the storage container 372 through the conservation vent 366 to prevent a vacuum from developing. Valve 380 is closed and valves 360 and 332 are opened. Measurements at the constant, higher pressure can now begin.

There are a number of ways to maintain constant pressure. In the preferred embodiment, the pump 320 continuously pumps liquid into the line at a rate that is more than sufficient to offset any decreases of volume in the line. Since this added volume increases the pressure in the line above what is required for the test, the high-pressure relief valve 340 will open (and stay open) to allow flow back into the measurement container 352. This method allows pressure to be maintained continuously—the pump is not turned on and off. The pressure sensor 314 is used only to verify that pressure remains constant during the measurement period. The differential pressure sensor 358 measures the level changes in the container. An alternative method is to turn the pump on and off, as dictated by the pressure sensor 314, as needed to maintain constant pressure. If line pressure rises above the higher level (i.e., the first test pressure), the high-pressure relief valve 340 will open and stay open (as in the first method) and allow product to flow back into the measurement container 352. The differential pressure sensor 358 will measure the level changes in this container. If line pressure drops below the first test pressure, the pump will remove product from the container and add it to the line. Again, the differential pressure sensor measures the level changes in the measurement container 352. These adjustments are made as often as is required to maintain constant pressure. The method used in the preferred embodiment provides more accurate pressure control than the alternative method.

When sufficient volume data have been obtained, the pressure is decreased to the lower level (i.e., the second test pressure). This is accomplished by closing valves 360 and 332 and then opening valve 380. It can also be done by opening only valve 330 and allowing product to enter the storage container 372; if this takes too long, valve 334 can also be opened to increase the flow rate into the storage container 372. Valve 334 should be closed before the line reaches the second test pressure as determined by the pressure sensor 314. If line pressure drops below the lower level (i.e., the second test pressure) during this process, the pump 320 makes a correction. (It is not essential that valve 332 be closed during these measurements because the higher pressure will not be exceeded.) Valve 380 is then closed and valve 360 is opened. Measurements at the constant, lower pressure can now begin.

If the second test pressure is atmospheric, it is reached by closing valve 332 and opening the bypass valve 334. (Valve 330 is kept closed.) Pressure is maintained at atmospheric level by keeping valve 334 open. The pump is turned off during this low-pressure measurement period.

The "high-level" alarms 390 and 394, as well as the "low-level" alarms 392 and 396 if present, are checked periodically, as is the pressure sensor 364, to determine whether any problems exist with regard to liquid level or pressure. At the completion of the test, valve 360 is closed, as well as any other valves that are still open. Some adjustment can be made to the levels of liquid in the containers 352 and 372, in preparation for the next leak detection test; in most cases, most of the liquid in these containers will be pumped back into the line.

Although a preferred embodiment of the present invention has been described above, it will be appreciated that certain alterations and modifications thereof will be apparent to those skilled in the art. It is therefore intended that the appended claims be interpreted as covering all such alterations and modifications as fall within the true spirit and scope of the invention.

What is claimed is:

1. A method for measuring the difference in the volumetric flow rate due to a leak between one pressure and at least one other pressure, after compensation has been made for thermally induced changes in the volume of liquid product in a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period; and (c) computing the difference in the temperature compensated volume rate between one pressure and at least one other pressure from the measured volume data at the pressures, including a correction for the thermally induced non-linear changes of volume between the measurement periods, wherein the difference in the temperature compensated volume rate between the pressures is computed from the rate of change of volume measured during the measurement periods (first derivative of the volume data or volume rate) and higher order derivatives of the volume data.

2. The method of claim 1, further comprising the step of comparing the difference in temperature compensated volume rate to a threshold value to determine whether said pipeline system has a leak.

3. The method of claim 1, further comprising the step of computing the temperature compensated volume rate due to a leak at a specific pressure using a model that describes the volume rate due to a leak as a function of pressure.

4. The method of claim 1, wherein the pressure level during one of the measurement periods is approximately equal to atmospheric pressure.

5. The method of claim 4, wherein measurements are made at two pressures, and the difference in the temperature compensated volume rate is the volume rate due to a leak at the pressure which is not atmospheric pressure.

6. The method of claim 1, wherein the duration of the measurement periods is approximately equal.

7. The method of claim 1, wherein the test duration, and the time intervals between measurement periods and between measurement periods and pressure changes, are selected to minimize the combined error due to the ambient thermally induced volume changes and the pressure induced thermal perturbations.

8. The method of claim 1, wherein the time intervals between measurement periods, and the time intervals between measurement periods and pressure changes for a given test duration, are selected to minimize the combined error due to ambient thermally induced volumes changes and pressure induced thermal perturbations.

9. The method of claim 8, wherein the combined error is minimized by maximizing the time intervals between each measurement period and the previous pressure change and by minimizing the time interval between measurement periods.

10. A method for measuring the difference in the volumetric flow rate due to a leak between one pressure and at least one other pressure, after compensation has been made for thermally induced changes in the volume of liquid product in a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period; and (c) computing the difference in the temperature compensated volume rate between one pressure and at least one other pressure from the measured volume data at the pressures, including a correction for the thermally induced non-linear changes of volume between periods, wherein the difference in the temperature compensated volume rate between the pressures is computed from the rate of change of volume measured during the measurement periods (first derivative of the volume data or volume rate) and the rate of change of the rate of change of volume during the measurement periods (second derivative of the volume data).

11. A method for measuring the difference in the volumetric flow rate due to a leak between one pressure and at least one other pressure, after compensation has been made for thermally induced changes in the volume of liquid product in a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period; and (c) computing the difference in the temperature compensated volume rate between one pressure and at least one other pressure from the measured volume data at the pressures, including a correction for the thermally induced non-linear changes of volume between periods, wherein the difference in the temperature compensated volume rate between the pressures is computed from the rate of change of volume measured during the measurement periods (first derivative of the volume data or volume rate), the rate of change of the rate of change of volume during the measurement periods (second derivative of the volume data), and the third derivative of the volume data collected during the measurement periods.

12. A method for measuring the difference in the volumetric flow rate due to a leak between one pressure and at least one other pressure, after compensation has been made for thermally induced changes in the volume of liquid product in a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period; and (c) computing the difference in the temperature compensated volume rate between one pressure and at least one other pressure from the measured volume data at the pressures, including a correction for the thermally induced non-linear changes of volume between periods, wherein the difference in the temperature compensated volume rate between the pressures is computed from the rate of change of volume measured during the measurement periods (first derivative of the volume data or volume rate), the rate of change of the rate of change of volume during the measurement periods (second derivative of the volume data), the third derivative of the volume data collected during the measurement periods, and higher derivatives of the volume data collected during the measurement periods.

13. The method of claim 1, wherein the computation of the difference in the temperature compensated volume rate between pressures comprises the steps of:

(a) computing the first derivative of the volume data during a first measurement period at a first pressure, and computing the first derivative of the volume data during a second measurement period at a second pressure;

(b) computing the second derivative of the volume data during the first and second measurement periods;

(c) computing the average of the second derivatives obtained in step (b);

(d) estimating the change in volume rate between the first and second measurement periods by multiplying the time between the mid-point of the measurement periods by the average obtained in step (c);

(e) estimating the first derivative of the volume data during the second measurement period, which does not include any incremental volume change due to a leak between the two pressures, by adding the estimate computed in step (d) to the first derivative of the volume data measured during the first measurement period; and (f) computing the difference in the temperature compensated volume rate between the first and second pressures by subtracting the estimate obtained in step (e) from the first derivative measured in step (a) during the second measurement period.

14. The method of claim 13, wherein one of the pressures is atmospheric pressure.

15. A method for estimating the error in a measurement of the difference in volumetric flow rates between different pressures, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period;

(c) computing the difference in the temperature compensated volume rate between one pressure and at least one other pressure from the measured volume data at the pressures, including a correction for the thermally induced non-linear changes of volume between the measurement periods; and (d) estimating the error by using at least two of the measurement periods wherein the pressure level is the same, and the error is estimated from the difference in the changes of volume measured during the measurement periods when the pressure level is the same.

16. A method for estimating the error in a measurement of the difference in volumetric flow rates between different pressures, comprising the method of claim 13 wherein during at least two of the measurement periods the pressure level is the same, and the error is estimated from the difference in the changes of volume measured during the measurement periods when the pressure level is the same.

17. The method of claim 1, wherein the difference in the temperature compensated volume rate between the pressures is computed from the rate of change of volume measured during the measurement periods (first derivative of the volume data or volume rate) and the rate of change of the rate of change of volume during the measurement periods (second derivative of the volume data).

18. The method of claim 1, wherein the difference in the temperature compensated volume rate between the pressures is computed from the rate of change of volume measured during the measurement periods (first derivative of the volume data or volume rate), the rate of change of the rate of change of volume during the measurement periods (second derivative of the volume data), and the third derivative of the volume data collected during the measurement periods.

19. The method of claim 1, wherein the difference in the temperature compensated volume rate between the pressures is computed from the rate of change of volume measured during the measurement periods (first derivative of the volume data or volume rate), the rate of change of the rate of change of volume during the measurement periods (second derivative of the volume data), the third derivative of the volume data collected during the measurement periods, and higher derivatives of the volume data collected during the measurement periods.

20. A method for estimating the error in a measurement of the difference in volumetric flow rates between different pressures, comprising the method of claim 1 wherein during at least two of the measurement periods the pressure level is the same, and the error is estimated from the difference in the changes of volume measured during the measurement periods when the pressure level is the same.

21. A method for estimating the error in a measurement of the difference in volumetric flow rates between different pressures on a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period; and (c) computing the difference in the temperature compensated volume rate between one pressure and at least one other pressure from the measured volume data at the pressures, including a correction for the thermally induced non-linear changes of volume between the measurement periods; and (d) of estimating the error by computing at least the next higher order derivative of the volume data than is used in the computation of difference in volumetric flow rates, and multiplying said next higher order derivative by the time between the measurement periods.

22. A method for estimating the systematic bias error due to pressure induced temperature perturbations during measurements of the difference in volumetric flow rates between different pressures on a pressurized pipeline system, comprising the method of claim 1 conducted when the pressurized pipeline system is known not to be leaking to obtain the systematic bias error for the pressure, line volume, and liquid at which the measurements are made.

23. A method for adjusting the systematic bias error for differences in pressures, line volume capacities, and liquid, comprising the method of claim 22 and further comprising the steps of:
(a) adjusting the systematic bias error between other pressures by extrapolating from the measured changes, if different pressures are used;
(b) adjusting the systematic bias error if the volume capacity of the pipeline system is increased or reduced by extrapolating for the increase of reduction in capacity of the pipeline system; and
(c) adjusting the systematic bias error obtained for a first liquid to an estimate for a second liquid, when the second liquid is used, by extrapolating for the difference in the thermal coefficients of the expansion for the two liquids.

24. The method of claim 22, in which the time interval between the mid-point of the pressure change and the mid-point of the next measurement period is approximately equal for all measurement periods.

25. A method for estimating the systematic bias error due to pressure induced temperature perturbations during measurements of the difference in volumetric flow rates between different pressures on a pressurized pipeline system, comprising the method of claim 1 conducted on at least one pressurized pipeline system that may be different from the one being tested and is known not to be leaking, to obtain the systematic bias error over the range of and for the pressures, line volumes, and liquids at which the measurements are made.

26. A method for adjusting the systematic bias error for differences in pressures, line volume capacities, and liquid, comprising the method of claim 25 and further comprising the steps of:
(a) adjusting the systematic bias error between other pressures by extrapolating from the measured changes, if different pressures are used;
(b) adjusting the systematic bias error if the volume capacity of the pipeline system is increased or reduced by extrapolating for the increase or reduction in capacity of the pipeline systems; and
(c) adjusting the systematic bias error obtained for a first liquid to an estimate for a second liquid, when the second liquid is used, by extrapolating for the difference in the thermal coefficients of the expansion for the two liquids.

27. The method of claim 25, in which the time interval between the mid-point of the pressure change and the mid-point of the next measurement period is approximately equal for all measurement periods.

28. A method for estimating the systematic bias error due to pressure induced temperature perturbations during measurements of the difference in volumetric flow rates between different pressures on a pressurized pipeline system, comprising the method of claim 1 and using a model to estimate the thermally induced volume changes that would be measured on a pipeline system without a leak to obtain the systematic bias error for the pressure, line volume, and liquid at which the model estimates are made.

29. A method for adjusting the systematic bias error for differences in pressures, line volume capacities, and liquid, comprising the method of claim 28 and further comprising the steps of:
(a) adjusting the systematic bias error between other pressures by extrapolating from the measured changes, if different pressures are used;
(b) adjusting the systematic bias error if the volume capacity of the pipeline system is increased or reduced by extrapolating for the increase or reduction in capacity of the pipeline systems; and
(c) adjusting the systematic bias error obtained for a first liquid to an estimate for a second liquid, when the second liquid is used, by extrapolating for the difference in the thermal coefficients of the expansion for the two liquids.

30. The method of claim 28, in which the time interval between the mid-point of the pressure change and the mid-point of the next measurement period is approximately equal for all measurement periods.

31. A method for estimating the error in a measurement of the difference in volumetric flow rates between different pressures computed using the method of claim 1, comprising the steps of:
(a) computing the difference between the second derivatives of the volume data during two measurement periods; and
(b) estimating the error as a percentage of the difference obtained in (a).

32. The method of claim 31, further comprising the step of comparing the error to a threshold error value, and repeating the preceding steps if the threshold error value is exceeded.

33. A method for estimating the error in a measurement of the difference in volumetric flow rates between different pressures on a pressurized pipeline system, comprising the method of claim 1, and further comprising the step of estimating the error by computing at least the next higher order derivative of the volume data than is used in the computation of difference in volumetric flow rates, and multiplying said next higher order derivative by the time between the measurement periods.

34. A method for measuring the difference in the volumetric flow rate due to a leak between one pressure and at least one other pressure, after compensation has been made for thermally induced changes in the volume of liquid product in a pressurized pipeline system, comprising the steps of:
(a) pressurizing said pipeline system to a first pressure level, and measuring those changes in volume of product in the pipeline system that occur when the pressure is maintained at an approximately constant pressure over a first measurement period;
(b) pressurizing said pipeline system to a second pressure level, and measuring those changes in volume of product in the pipeline system that occur when the pressure is maintained at an approximately constant pressure over a second measurement period;
(c) pressurizing said pipeline system to a third pressure level, and measuring those changes in volume of product in the pipeline system that occur when the pressure is maintained at an approximately constant pressure over a third measurement period; and
(d) computing the difference in temperature compensated volume rate between a pressure that is between the second pressure and the first and third pressures, including a correction for the thermally induced non-linear changes of volume between the measurement periods, wherein the difference in the temperature compensated volume rate between the pressures is computed by subtracting the time-weighted rate of change of volume measured during the second measurement period from the time-weighted average of the rate of change of volume measured during the first and third measurement periods.

35. The method of claim 34, further comprising the step of comparing the difference in temperature compensated volume rate to a threshold value to determine whether said pipeline system has a leak.

36. The method of claim 34, further comprising a correction for non-linear changes of volume between measurement periods utilizing higher order derivatives of the volume data measured during a plurality of the measurement periods.

37. A method for estimating the error in a measurement of the difference in volumetric flow rates between different pressures, comprising the method of claim 36 wherein during the three measurement periods the pressure level is the same, and the error is estimated from the difference in the changes of volume measured during the measurement periods.

38. The method of claim 34, further comprising a correction for non-linear changes of volume between measurement periods utilizing the second derivative of the volume data measured during a plurality of the measurement periods.

39. The method of claim 38, wherein the correction includes higher order derivatives of the volume data in addition to the second derivative.

40. The method of claim 34, wherein the pressure level during two sequential measurement periods is approximately equal.

41. The method of claim 34, wherein the pressure level during at least one of the measurement periods is atmospheric pressure.

42. A method for estimating the error in a measurement of the difference in volumetric flow rates between different pressures, comprising the method of claim 34 wherein during the three measurement periods the pressure level is the same, and the error is estimated from the difference in the changes of volume measured during the measurement periods.

43. A method for estimating the systematic bias error due to pressure induced temperature perturbations during measurements of the difference in volumetric flow rates between different pressures on a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period; and (c) computing the difference in the temperature compensated volume rate between one pressure and at least one other pressure from the measured volume data at the pressures, including a correction for the thermally induced non-linear chances of volume between the measurement periods;

wherein the measurements are conducted when the pressurized pipeline system is known not to be leaking to obtain the systematic bias error for the pressure, line volume, and liquid at which the measurements are made.

44. A method for adjusting the systematic bias error for differences in pressures, line volume capacities, and liquid, comprising the method of claim 43 and further comprising the steps of:

(a) adjusting the systematic bias error between other pressures by extrapolating from the measured changes, if different pressures are used;

(b) adjusting the systematic bias error if the volume capacity of the pipeline system is increased or reduced by extrapolating for the increase of reduction in capacity of the pipeline system; and (c) adjusting the systematic bias error obtained for a first liquid to an estimate for a second liquid, when the second liquid is used, by extrapolating for the difference in the thermal coefficients of the expansion for the two liquids.

45. The method of claim 43, in which the time interval between the mid-point of the pressure change and the mid-point of the next measurement period is approximately equal for all measurement periods.

46. A method for estimating the systematic bias error due to pressure induced temperature perturbations during measurements of the difference in volumetric flow rates between different pressures on a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period; and (c) computing the difference in the temperature compensated volume rate between one pressure and at least one other pressure from the measured volume data at the pressures, including a correction for the thermally induced non-linear changes of volume between the measurement periods;

wherein the measurements are conducted on at least one pressurized pipeline system that may be different from the one being tested and is known not to be leaking, to obtain the systematic bias error over the range of and for the pressures, line volumes, and liquids at which the measurements are made.

47. A method for adjusting the systematic bias error for differences in pressures, line volume capacities, and liquid, comprising the method of claim 46 and further comprising the steps of:

(a) adjusting the systematic bias error between other pressures by extrapolating from the measured changes, if different pressures are used;

(b) adjusting the systematic bias error if the volume capacity of the pipeline system is increased or reduced by extrapolating for the increase or reduction in capacity of the pipeline systems; and (c) adjusting the systematic bias error obtained for a first liquid to an estimate for a second liquid, when the second liquid is used, by extrapolating for the difference in the thermal coefficients of the expansion for the two liquids.

48. The method of claim 46, in which the time interval between the mid-point of the pressure change and the mid-point of the next measurement period is approximately equal for all measurement periods.

49. A method for estimating the systematic bias error due to pressure induced temperature perturbations during measurements of the difference in volumetric flow rates between different pressures on a pressurized pipeline system, comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period;

(c) computing the difference in the temperature compensated volume rate between one pressure and at least one other pressure from the measured volume data at the pressures, including a correction for the thermally induced non-linear changes of volume between the measurement periods; and (d) using a model to estimate the thermally induced volume changes that would be measured on a pipeline system without a leak to obtain the systematic bias error for the pressure, line volume, and liquid at which the model estimates are made.

50. A method for adjusting the systematic bias error for differences in pressures, line volume capacities, and liquid, comprising the method of claim 49 and further comprising the steps of:

(a) adjusting the systematic bias error between other pressures by extrapolating from the measured changes, if different pressures are used;

(b) adjusting the systematic bias error if the volume capacity of the pipeline system is increased or reduced by extrapolating for the increase or reduction in capacity of the pipeline systems; and (c) adjusting the systematic bias error obtained for a first liquid to an estimate for a second liquid, when the second liquid is used, by extrapolating for the difference in the thermal coefficients of the expansion for the two liquids.

51. The method of claim 49, in which the time interval between the mid-point of the pressure change and the mid-point of the next measurement period is approximately equal for all measurement periods.

52. A method for estimating the systematic bias error due to pressure induced temperature perturbations during measurements of the difference in volumetric flow rates between different pressures on a pressurized pipeline system containing liquid product, comprising the steps of:

(a) changing the pressure level in the pipeline system from a first pressure level to a second pressure level, and measuring those changes in volume of product in the pipeline system that occur when the pressure is maintained at an approximately constant pressure over a first measurement period;

(b) changing the pressure level in the pipeline system from the second pressure level to a third pressure level, the difference between the third pressure level and the second pressure level being approximately equal to the difference between the second pressure level and the first pressure level, and measuring those changes in volume of product in the pipeline system that occur when the pressure is maintained at an approximately constant pressure over a second measurement period;

(c) changing the pressure level in the pipeline system from the third pressure level to approximately the second pressure level, and measuring those changes in volume of product in the pipeline system that occur when the pressure is maintained at an approximately constant pressure over a third measurement period;

(d) computing the difference in temperature compensated volume rate between (i) the second and third pressures during the first and second measurement periods and (ii) the third and second pressures during the second and third measurement periods, including a correction for the thermally induced non-linear changes of volume between the measurement periods; and (e) subtracting (d)(i) from (d)(ii) to obtain the systematic bias error.

53. The method of claim 52, wherein the measurement periods are located at approximately equal intervals in time from the pressure changes.

54. The method of claim 52, wherein the measurement periods are of approximately equal duration.

55. The method of claim 52, wherein the measurement periods are located at approximately equal intervals in time from the pressure changes, and the measurement periods are of approximately equal duration.

56. A method for estimating the error in a measurement of the difference in volumetric flow rates between different pressures comprising the steps of:

(a) pressurizing said pipeline system to a first pressure level, and measuring those changes in volume of product in the pipeline system that occur when the pressure is maintained at an approximately constant pressure over a first measurement period;

(b) pressurizing said pipeline system to at least a second pressure level, and measuring those changes in volume of product in the pipeline system that occur when the pressure is maintained at an approximately constant pressure over at least a second measurement period;

(c) computing the difference in the temperature compensated volume rate between one pressure and at least one other pressure from the measured volume data at the pressures, including a correction for the thermally induced non-linear changes of volume between the measurement periods;

(d) computing the difference between the second derivatives of the volume data during two measurement periods; and (e) estimating the error as a percentage of the difference obtained in (d).

57. The method of claim 56, further comprising the step of comparing the error to a threshold error value, and repeating the preceding steps if the threshold error value is exceeded.

* * * * *